(12) United States Patent
Namekata et al.

(10) Patent No.: US 6,512,738 B1
(45) Date of Patent: Jan. 28, 2003

(54) APPARATUS FOR AND METHOD OF RECEIVING DIVERSITY

(75) Inventors: Minoru Namekata, Kawasaki (JP); Kazumi Sato, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/227,190

(22) Filed: Jan. 8, 1999

(30) Foreign Application Priority Data

Jan. 14, 1998 (JP) .......................................... 10-006071

(51) Int. Cl.$^7$ ................................................ H04B 7/02
(52) U.S. Cl. ....................... 370/210; 370/343; 370/480; 375/347; 375/350; 455/137
(58) Field of Search ................................. 370/208, 210, 370/343, 203, 480, 481, 497; 375/347, 349, 350; 455/137, 138, 273, 303

(56) References Cited

U.S. PATENT DOCUMENTS

| | | | | |
|---|---|---|---|---|
| 4,715,048 A | * | 12/1987 | Masamura | ................... 375/347 |
| 5,481,570 A | * | 1/1996 | Winters | ....................... 375/347 |
| 5,528,581 A | * | 6/1996 | De Bot | ......................... 370/203 |
| 5,867,478 A | * | 2/1999 | Baum et al. | ................. 370/203 |
| 6,131,016 A | * | 10/2000 | Greenstein et al. | ........... 455/69 |
| 6,178,158 B1 | * | 1/2001 | Suzuki et al. | ................ 370/203 |

FOREIGN PATENT DOCUMENTS

JP            9-284191           10/1997

* cited by examiner

*Primary Examiner*—Min Jung
(74) *Attorney, Agent, or Firm*—Foley & Lardner

(57) ABSTRACT

Correspondingly to transmission channel frequency responses calculated at each of a plurality of receiving parts respectively, frequency spectrum signals, which are obtained by transforming frequency of received orthogonal frequency division multiplexing signals, are given weighting, and frequency spectrum signals for each are combined. With these steps, not only estimation of distortion in the amplitude direction and in the phase direction becomes more accurate, but also reproduction of frequency spectrum signals and digital signal sequence becomes more precise so as to realize combined diversity reception.

14 Claims, 12 Drawing Sheets

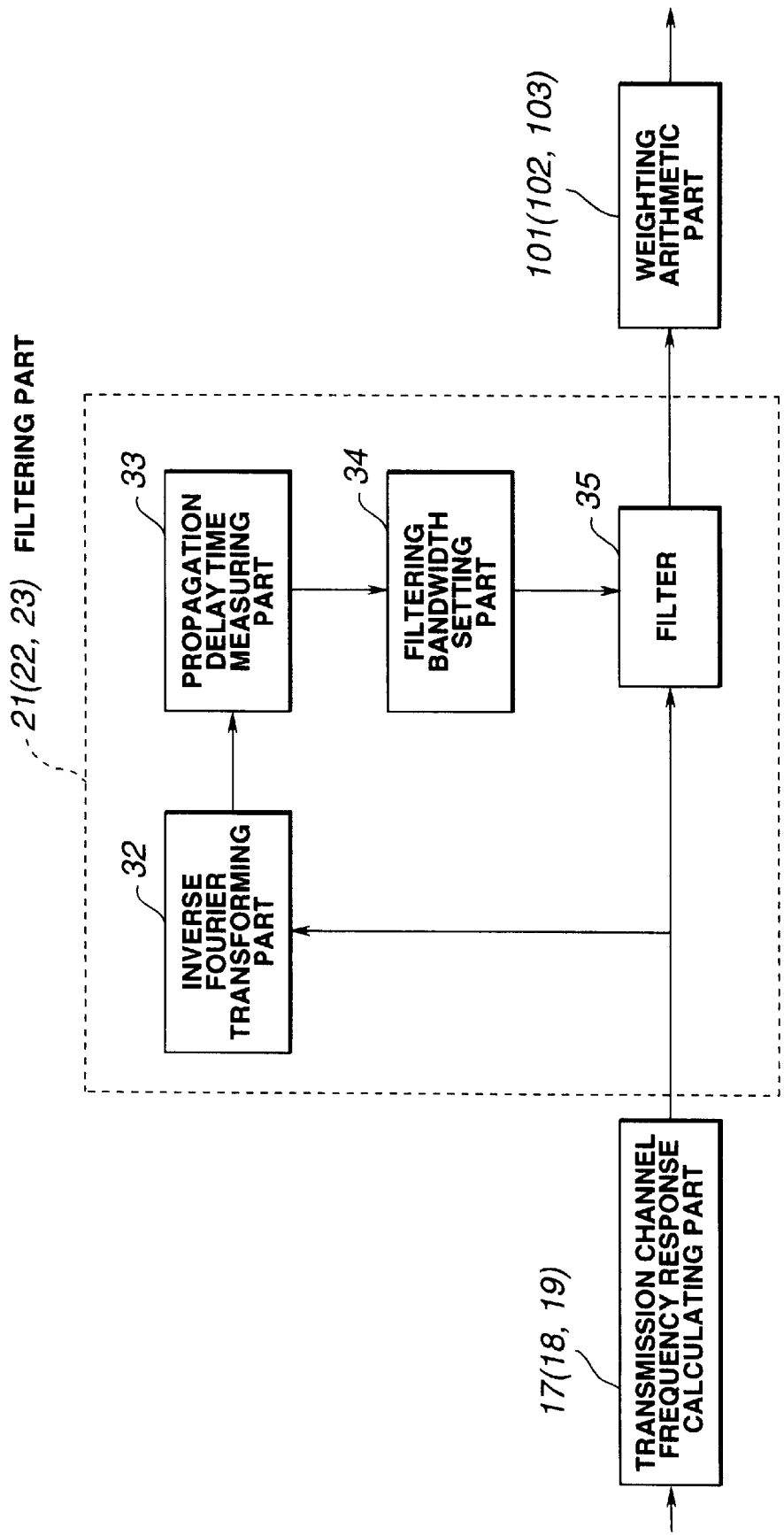

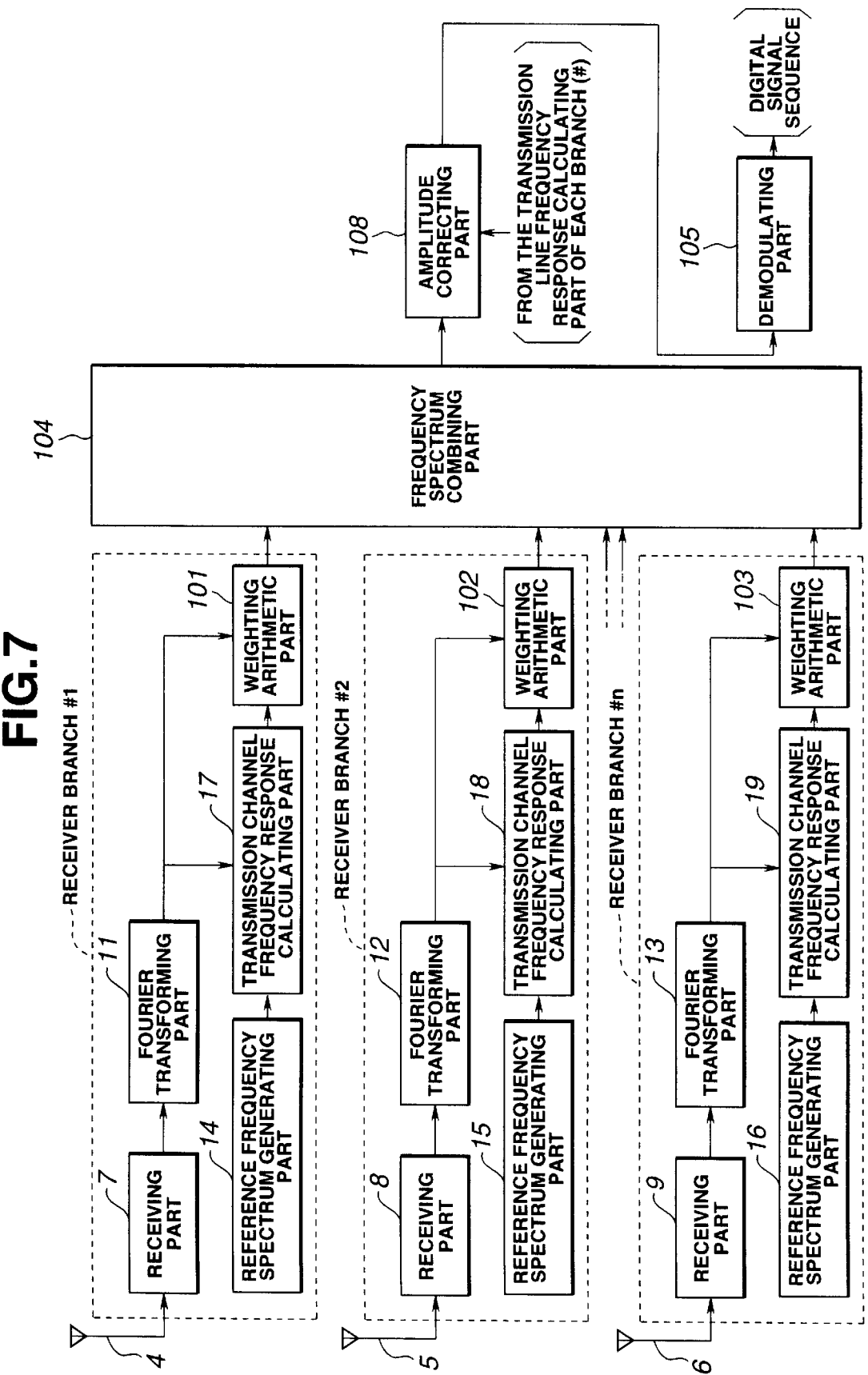

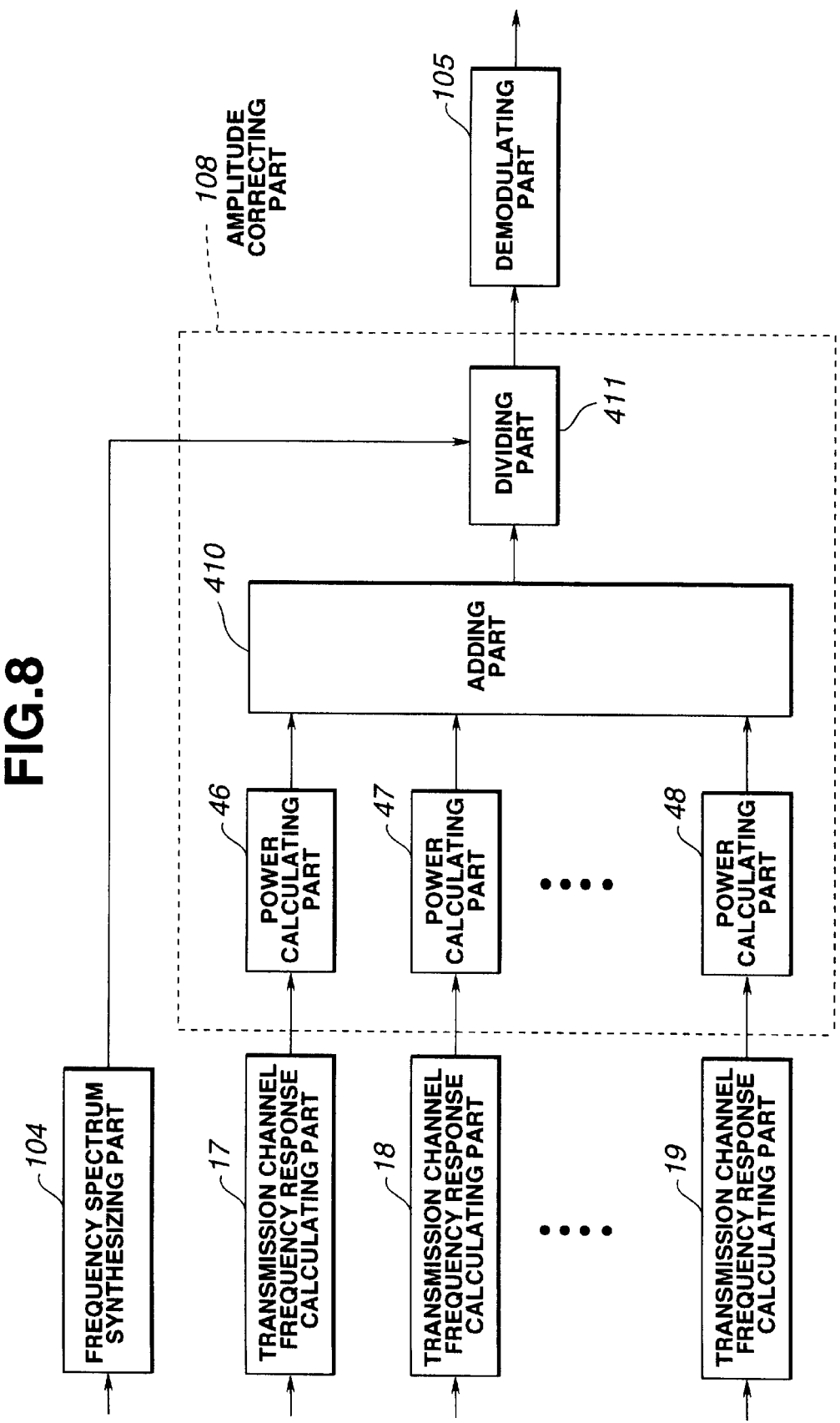

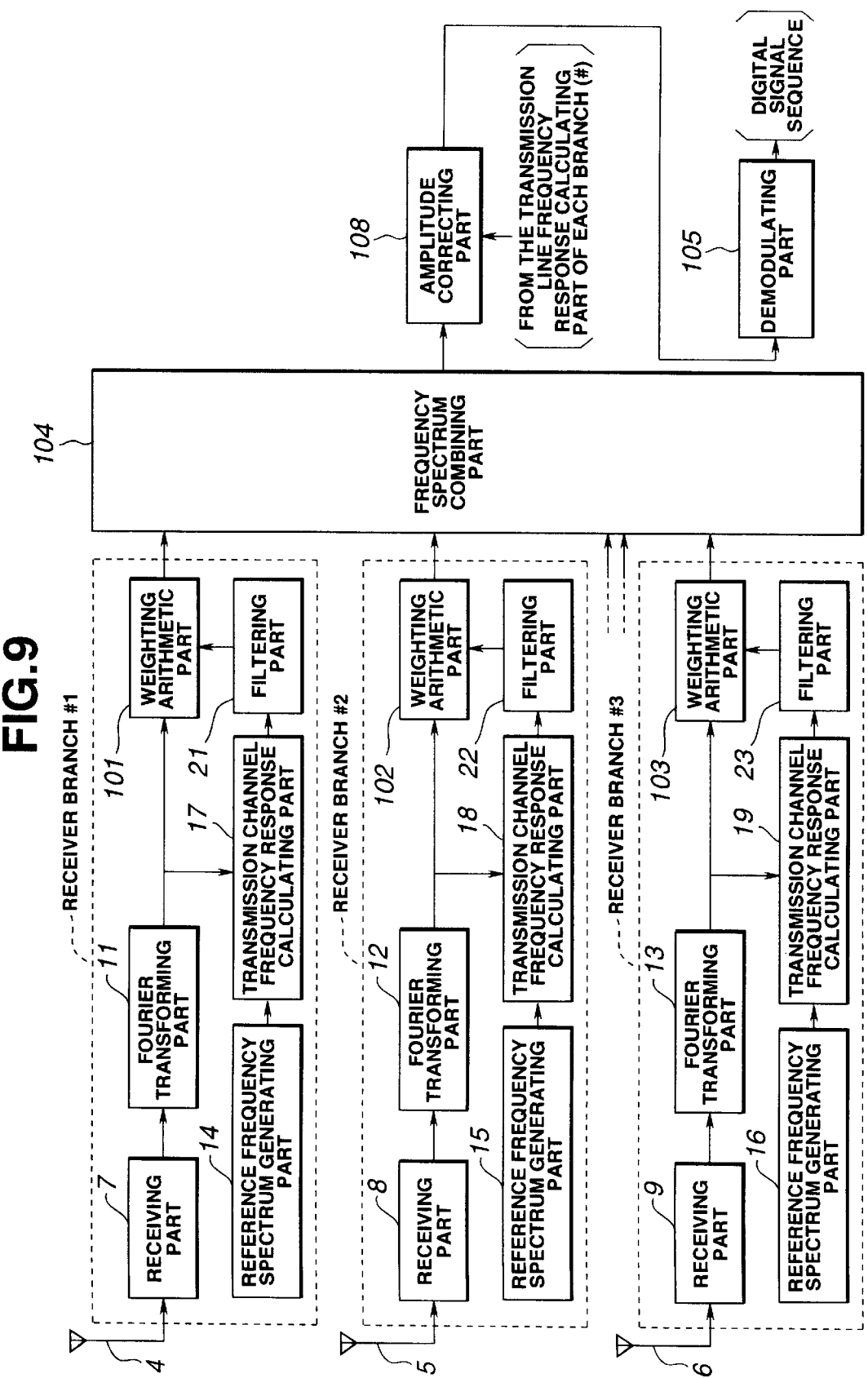

D/U=5[dB]
WITHOUT DIVERSITY

APPARATUS FOR AND METHOD OF RECEIVING DIVERSITY

BACKGROUND OF THE INVENTION FIELD OF THE INVENTION

The present invention relates to an apparatus for and a method of receiving diversity to be used at a base station or terminal station of a radio communication system, where a digital signal sequence is radio-transmitted in the Orthogonal Frequency Division Multiplexing (OFDM) transmission system, or at a receiving station of a broadcasting system where radio broadcasting by a digital signal sequence is carried out in the transmission system.

DESCRIPTION OF THE RELATED ART

For terrestrial television broadcasting, the analog system has been used until now. However, shifting to the digital system is planned to start by the year of 2000.

Since one transmitting station of terrestrial television broadcasting has to cover a very large area, receiving side apparatus tends to be affected by multipath reflection wave propagation (multipath), which is characteristic of radio wave propagation and deteriorates the quality of images by causing a ghost on received images, giving rise to a serious problem.

The scale of this multipath is much larger than that of the multipath which is the object of radio communication system used for cellular phones, mobile phones, or the like. Consequently, even with adaptive automatic equalizers, which are regarded to be effective as a multipath countermeasure in a radio communication system of this type, this problem cannot be coped with any longer.

Accordingly, an orthogonal frequency division multiplexing (OFDM) transmission system, which is resistant enough, in principle, to a poor environment for multipath propagation and able to transmit information of high quality, is expected to be used as the digital transmission system for terrestrial television broadcasting.

In OFDM signals transmitted in this OFDM transmission system, guarded intervals, which are copied from a part of transmission waveform (symbol), have been provided to absorb multipath propagation with a interval length shorter than that of the guarded intervals so as to prevent the quality of received images from getting fatally deteriorated. This multipath-resistant transmission characteristic of the OFDM transmission system has attracted the notice of the broadband radio communication system industry, such as multimedia communications, which will be developed in the public switched telephone network or private branch exchange, in addition to terrestrial television broadcasting, and the use of this system is under technical discussion.

Further, since the OFDM transmission system, utilizing this multipath-resistant transmission characteristics, enables the configuration of single frequency networks (SFN) which transmit the same content in the same frequency simultaneously, it is a very effective transmission system avoiding such waste in using frequencies as in conventional situations where transmitting frequencies have to be changed from area to area.

However, although the OFDM transmission system has excellent multipath-resistant transmission characteristics, it cannot secure perfect quality of reception without deterioration in reception caused by influences of intense frequency selective fading due to multipath propagation, Doppler shift which occurs on mobile reception, or influences of time fading.

In particular, in order to transmit images of quality high enough to meet the expectations of digital terrestrial television broadcasting or multimedia communications for the next generation (high definition images), much higher stability and quality are required in radio transmission technique than that for existing cellular phones, mobile phones, or the like whose main task is voice communications. A receiving apparatus which provides better reception characteristics is urgently needed.

Furthermore, for effective utilization of frequencies, techniques for transmitting high definition images having a large amount of information in a narrow radio band are required. The use of modulating systems which are highly efficient in a radio propagation environment with mobility taken into account, for example, a high efficiency modulating system such as the QAM modulating system.

However, a problem arises. Since a high efficiency modulating system of this type is low in noise-resistance or interference-resistance (weak in distortion), it cannot realize transmission of information of satisfactory quality at a receiving apparatus which receives radio waves while moving or at a remote place from a transmitting station or base station, because radio waves have to be received in a state of low signal-to-noise ratio or in a state where propagation of radio waves is distorted to deteriorate reception readily.

Particularly, for terrestrial television broadcasting, which covers an extremely large area, development of techniques to improve the reception quality is desired because deterioration in reception is a serious problem for it.

As a device to improve reception characteristic in a poor environment for multipath wave propagation or for mobile reception, diversity reception has conventionally been considered. In order to realize diversity reception, however, it is necessary to identify distortion in time fading in a poor environment for radio wave propagation (to estimate amount of change in the direction of time base), and to identify distortion in frequency-selective fading (to estimate amount of change in the direction of frequency base). In a combining diversity, in particular, efficient combine (combine at the maximum ratio) cannot be carried out unless distortion (in amplitude and phase) is accurately estimated for each receiver branch.

Conventionally, application of a combining diversity has not been positive due to difficulties in estimating this distortion.

Thus, when radio transmission of digital signal sequence is carried out in the orthogonal frequency division multiplexing transmission system, although its multipath-resistant transmission characteristic of the orthogonal frequency division multiplexing transmission system is utilized effectively, it is still necessary to devise a measure to improve deterioration of reception characteristic in a severe environment for multipath reflection wave propagation or to apply a measure to improve deterioration of reception characteristic in mobile reception in order to realize transmission of information in high quality and precision everywhere in a large area to cover. Particularly, in the future when transmission of image information is going to be a main task of multimedia communications or digital terrestrial broadcasting, it is indispensable to apply a high efficiency modulating system, such as QAM modulation, and to devise a measure to improve receiving characteristic in the orthogonal frequency division multiplexing transmission system. Development of a diversity receiving technique for OFDM signals is most necessary.

OBJECTS AND SUMMARY OF THE INVENTION

It is an object of the present invention to provide an apparatus for and a method of receiving diversity which can improve combining diversity performance by estimating distortion accurately for each receiver branch.

It is another object of the present invention to provide an apparatus for and a method of receiving diversity which can improve the reception of the orthogonal frequency division multiplexing signals, which has used high efficiency modulating system in the environment of multipath reflection wave propagation or of mobile reception.

It is another object of the present invention to provide an apparatus for and a method of receiving diversity wherein high quality transmission of information is realized even in a poor environment for radio propagation.

A method of receiving diversity according to the present invention comprises; a receiving step for receiving orthogonal frequency division multiplexing signals which have been radio-transmitted, a frequency transforming procedure for transforming frequencies of the orthogonal frequency division multiplexing signals to obtain a plurality of frequency spectrum signals, a weighting step for weighting on spectrum signals before of combining processing given by said frequency transforming step correspondingly to transmission channel frequency responses found from said transforming frequency spectrum signals, a combining step for combining the plurality of frequency spectrum signals to obtain combined frequency spectrum signals, and a demodulating procedure for demodulating digital signal sequence from the combined frequency spectrum signals.

An apparatus for receiving diversity according to the present invention comprises; receiving unit which receives orthogonal frequency division multiplexing signals which have been radio-transmitted, frequency transforming unit which obtains a plurality of frequency spectrum signals by transforming frequencies of said orthogonal frequency division multiplexing signals, weighting unit which weights on spectrum signals before of combining processing given by said frequency transforming unit correspondingly to transmission channel frequency response obtained from said transforming frequency spectrum signals, combining unit which obtains combined frequency spectrum signals by combining a plurality of said frequency spectrum signals, and demodulating unit which demodulates digital signal sequence from said combined frequency spectrum signals.

Other features and advantages of the present invention will become further apparent from the following description.

BRIEF DESCRIPTION OF THE DRAWINGS

FIG. 5 shows an example of a filtering part of the apparatus for receiving OFDM diversity in FIG. 4;

FIG. 7 shows a configuration of an apparatus for receiving OFDM diversity which is constructed in accordance with a fifth embodiment of the present invention;

FIG. 8 shows an example of an amplitude correcting part of the apparatus for receiving OFDM diversity in FIG. 7;

FIG. 9 shows a configuration of an apparatus for receiving OFDM diversity which is constructed in accordance with a sixth embodiment of the present invention;

DETAILED DESCRIPTION OF THE PREFERRED EMBODIMENTS

The present invention has been described in detail with reference to the accompanying drawings which show the preferred embodiments.

Figure 1:
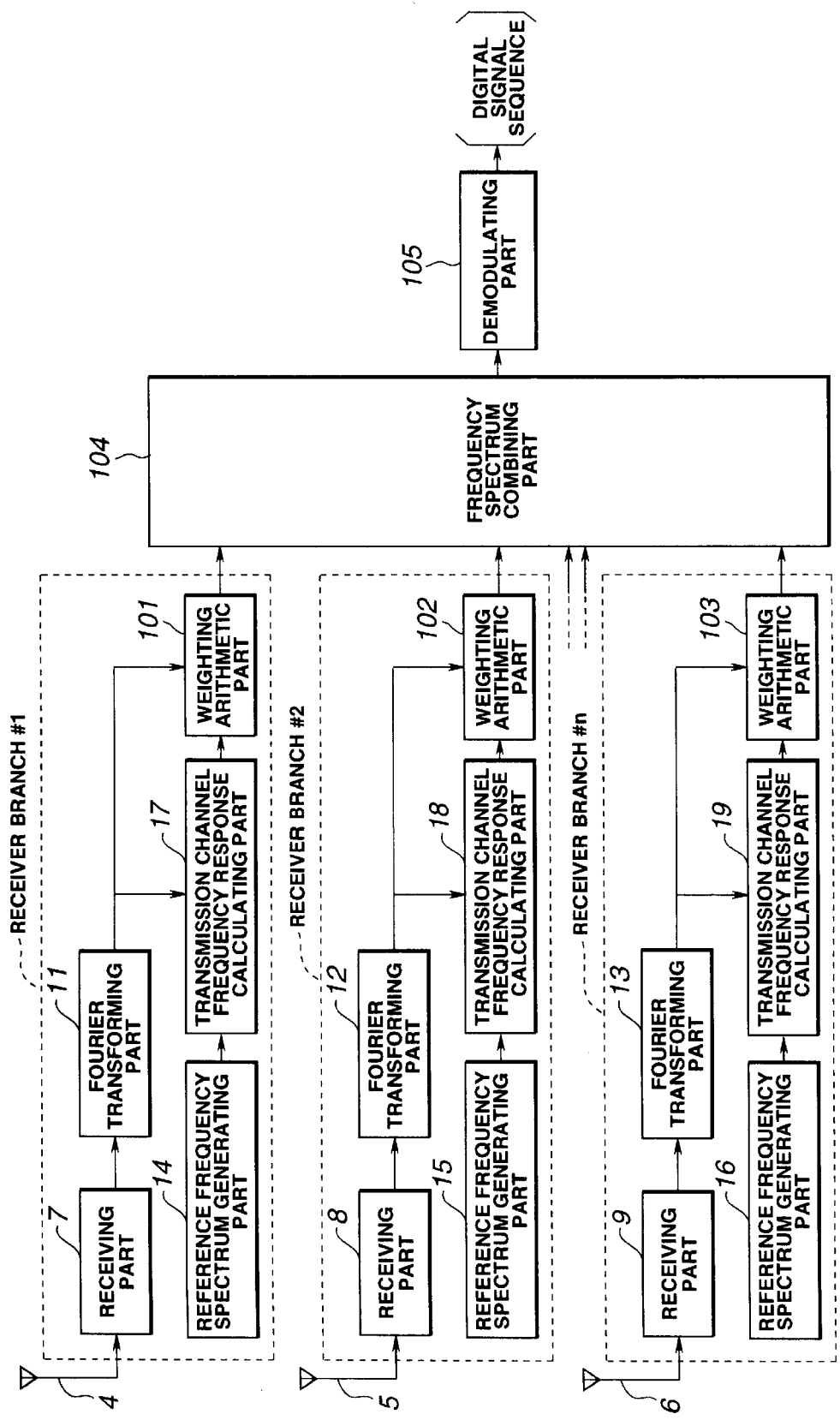
FIG. 1 shows a configuration of an apparatus for receiving OFDM diversity which is constructed in accordance with a first embodiment of the present invention.

FIG. 1 shows a configuration of an apparatus for receiving OFDM diversity which is constructed in accordance with a first embodiment of the present invention.

As shown in this figure, this apparatus for receiving OFDM diversity has a plurality of receiver branches #1 to #n, a frequency spectrum combining part 104 for combining frequency spectrum signals which is outputted from a plurality of these receiver branches #1 to #n, and a demodulating part 105 for demodulating digital signal sequence from frequency spectrum signals which is combined by this frequency spectrum signal combining part 104 (hereinafter referred to as a combined frequency spectrum signal).

The receiver branch #1 has an antenna 4, a receiving part 7, a Fourier transforming part 11, a reference frequency spectrum generating part 14, a transmission channel frequency response calculating part 17, and a weighting arithmetic part 101. The receiver branch #2 has an antenna 5, a receiving part 8, a Fourier transforming part 12, a reference frequency spectrum generating part 15, a transmission channel frequency response calculating part 18, and a weighting arithmetic part 102. The receiver branch #n has an antenna 6, a receiving part 9, a Fourier transforming part 13, a reference frequency spectrum generating part 16, a transmission channel frequency response calculating part 19, and a weighting arithmetic part 103.

The receiving parts 7 to 9 receive and process OFDM transmission signals received by the antennas 4 to 6. The receiving parts 7 to 9 have various means provided, such as means necessary for frequency conversion of RF frequency signals into baseband signals (to amplify, to mix frequencies and to limit frequency band), a synchronizing means, a frequency correcting means, and a means for removing the guarded interval, which is characteristic of the OFDM transmission system. The Fourier transforming parts 11 to 13 transform frequency spectrum signals by giving fast Fourier transforming processing to received OFDM transmission signals. The reference frequency spectrum generating parts 14 to 16 transform frequency spectrum signals for reference which correspond to frequency spectrum signals converted by each of the Fourier transforming parts 11 to 13 hereinafter referred to as a reference frequency spectrum signal). The transmission channel frequency response calculating parts 17 to 19 calculate transmission channel frequency responses, which are characteristic of each receiver branch, using frequency spectrum signals of these OFDM transmission signals and reference frequency spectrum signals.

In general with radio communication systems or broadcasting systems, transmission is carried out using an information frame or slot, and known signals are transmitted by the frame or by the slot intervalically. In the OFDM system, the known signals have been prepared beforehand as frequency spectrum signals, and this frequency spectrum is a reference frequency spectrum.

The reference frequency spectrum is known signals which have been predetermined among transmitting and receiving stations, and reference frequency spectrum itself is transformed at a reference frequency spectrum generating part. For example, the reference frequency spectrum generating parts 14 to 16 transform reference frequency spectrum using memories such as ROM.

Now, a description will be given on the operations of this apparatus for receiving OFDM diversity which is constructed in accordance with the first embodiment and configured in the manner mentioned above.

When this apparatus for receiving OFDM diversity receives OFDM transmission signals, which have been sent from a transmitting means such as a broadcasting station, at the antennas 4 to 6 of each of the receiver branches #1 to #n, the received OFDM transmission signals are inputted to each of the receiving parts 7 to 9. The receiving parts 7 to 9, after giving amplifying, frequency-mixing and frequency band-limiting to the OFDM transmission signals, carry out frequency conversion from RF frequency signals to baseband signals. The baseband signals are, then, given receiving processing such as synchronous picking-up, frequency correction, and removal of guarded interval, which is characteristic of the OFDM transmission system. The baseband signals, from which guarded intervals have been removed, are outputted to each of the Fourier transforming parts 11 to 13.

At each of the Fourier transforming parts 11 to 13, baseband signals inputted from each of the receiving parts 7 to 9 are converted into frequency spectrum signals through fast Fourier transformation, and outputted to the transmission channel frequency response calculating parts 17 to 19 and the weighting arithmetic parts 101 to 103.

Meanwhile, at each of the reference frequency spectrum generating parts 14 to 16, reference frequency spectrum signals, which correspond to frequency spectrum signals converted by each of the Fourier transforming parts 11 to 13, are transformed and outputted to the transmission channel frequency response calculating parts 17 to 19.

At each of the transmission channel frequency response calculating parts 17 to 19, transmission channel frequency responses, which are characteristic of each of the receiver branches #1 to #n are calculated using frequency spectrum signals inputted from each of the Fourier transforming parts 11 to 13 and reference frequency spectrum signals inputted from each of the reference frequency spectrum generating parts 11 to 16, and outputted to the weighting arithmetic parts 101 to 103.

At each of the weighting arithmetic parts 101 to 103, the frequency spectrum from each of the Fourier transforming parts 11 to 13 is calculated its weighting on the basis of transmission channel frequency responses from each of the transmission channel frequency response calculating parts 17 to 19. Weighting arithmetic is an arithmetic processing to carry out weighting on frequency spectra, which have been converted by the Fourier transforming parts 11 to 13, for each spectrum.

The series of processing described so far is shown in mathematical expressions as follows:

Here, OFDM transmission signals are supposed to be received at a receiver branch #1 in the i-th place.

When OFDM transmission signals are received at an antenna of a receiver branch #i, and undergo receiving processing and Fourier transforming processing, suppose that the converted frequency spectrum is r(i, j), the processing can be represented as follows with (j) expressing the spectrum number:

$$r(i, j) = h(i, j)s(j) + n(i, j) \quad (1)$$

The symbol h(i, j) expresses a real transmission channel frequency response in the j-th spectrum of the i-th branch. The symbol s(j) expresses the j-th spectrum which has been modulated by transmission information transmitted. The symbol n(i, j) expresses added noise component in the j-th spectrum of the i-th branch. When a transmission channel frequency response is calculated, s(j) of the received signal frequency spectrum r(i, j) is the reference frequency spectrum.

Since the reference frequency spectrum, which is transformd by a reference frequency spectrum generating part of the receiver branches #i, is s(j), transmission channel frequency response $\underline{h}(i, j)$, which is calculated at a transmission channel frequency response calculating part, goes as follows:

$$\begin{aligned}\underline{h}(i, j) &= r(i, j)s^*(j)/|s(j)|^2 \\ &= h(i, j) + n(i, j)s^*(j)/|s(j)|^2 \\ &= h(i, j) + n'(i, j)\end{aligned} \quad (2)$$

The symbol s*(j) expresses a conjugate-complex component of reference frequency spectrum s(j) prepared on the receiving side.

At a weighting arithmetic part, a processing expressed in the following equation (3) is given, using equation (2), to the output r(i, j) from a Fourier transforming part after the time of equation (1).

$$r(i, j)\underline{h}^*(i, j)/|\underline{h}(i, j)|^2 \approx s(j) + n''(i, j) \quad (3)$$

where, $n''(i, j) = n(i, j) \cdot \underline{h}^*(i, j)/|\underline{h}(i, j)|^2$.

That is, at the weighting arithmetic part, processing is carried out by multiplying $\underline{h}^*(i, j)/|\underline{h}(i, j)|^2$.

Each of frequency spectrum signals, which have been weighted in this manner, are outputted to the frequency spectrum combining part 104 from each of the receiver branches #1 to #n. At the frequency spectrum combining part 104, a plurality of inputted frequency spectrum signals are combined and outputted to the demodulating part 105 as combined frequency spectrum signals.

Through correction shown by the equation (3), distortion component h(i, j) is removed and transmitted signal component s(j) is reproduced at any receiver branch. Accordingly, by simply combining results of weighting processing shown by equation (3), common-mode combine of signal components is carried out. Meanwhile, the second term of the right side of equation (3) is a noise component which is not correlative at each branch and suppressed by combining.

At the demodulating part 105, predetermined de-mapping processing or parallel/serial conversion is carried out to combined frequency spectrum signals inputted, and digital signal sequence which has been transmitted is demodulated.

Thus, an apparatus for receiving OFDM diversity constructed in accordance with a first embodiment can realize more accurate reception of combined diversity, because it converts every OFDM transmission signal received at a plurality of receiver branches #1 to #n into frequency spectrum signals, carries out weighting on each frequency spectrum signal using transmission channel frequency responses calculated by each of the transmission channel frequency response calculating parts 17 to 19, then, combines a frequency spectrum signal for each. In addition, this realization of diversity reception improves reception characteristic. Moreover, it can realize transmission of information in high quality even in a poor environment for radio propagation.

Figure 2:
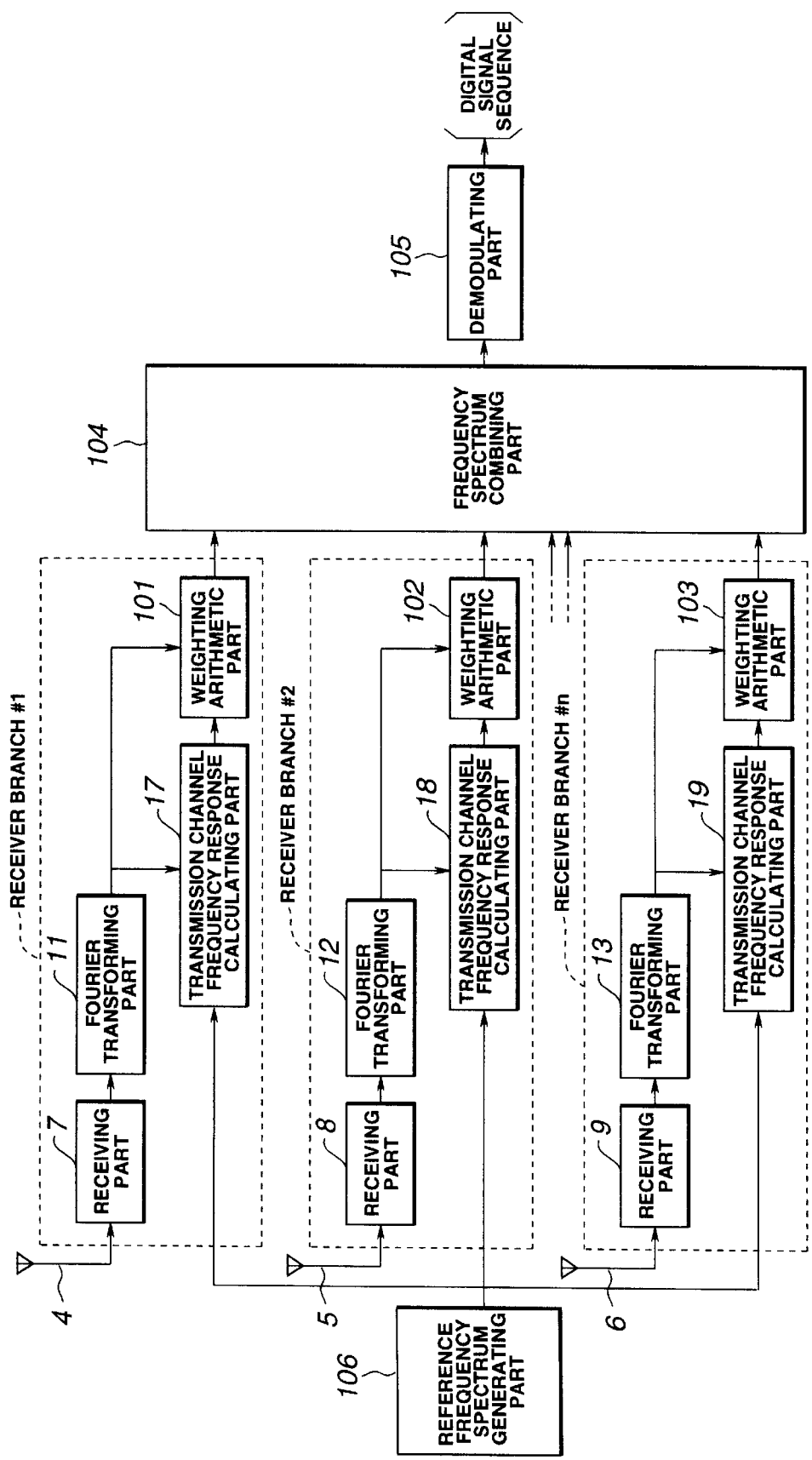
FIG. 2 shows a configuration of an apparatus for receiving OFDM diversity which is constructed in accordance with a second embodiment of the present invention.

FIG. 2 shows an apparatus for receiving OFDM diversity constructed in accordance with a second embodiment of the present invention.

This second embodiment is an example wherein all of the reference frequency spectrum generating parts 14 to 16 in the first embodiment are integrated into one reference frequency spectrum generating part 106 because it was noticed that reference frequency spectra transformd at reference frequency spectrum generating parts 14 to 16 are all the same.

In the apparatus for receiving OFDM diversity according to a second embodiment, in a similar manner to the above, OFDM transmission signals received at the antennas 4 to 6 are inputted to each of the receiving parts 7 to 9, converted into baseband signals, and inputted to each of the Fourier transforming parts 11 to 13.

At each of the Fourier transforming parts 11 to 13, baseband signals from each of the receiving parts 7 to 9 are converted into frequency spectrum signals through fast Fourier transformation, and outputted to the transmission channel frequency response calculating parts 17 to 19 and the weighting arithmetic parts 101 to 103.

Meanwhile, at the reference frequency spectrum generating part 106, reference frequency spectrum signals, which correspond to frequency spectrum signals converted by the Fourier transforming parts 11 to 13, are transformed and outputted to each of the transmission channel frequency response calculating parts 17 to 19.

At each of the transmission channel frequency response calculating parts 17 to 19, transmission channel frequency responses, which are characteristic of each of the receiver branches #1 to #n, are calculated using frequency spectrum signals inputted from each of the Fourier transforming parts 11 to 13 and reference frequency spectrum signals inputted from the reference frequency spectrum generating part 106, and outputted to the weighting arithmetic parts 101 to 103.

At each of the weighting arithmetic parts 101 to 103, frequency spectra from each of the Fourier transforming parts 11 to 13 are calculated their weighting on the basis of transmission channel frequency responses from each of the transmission channel frequency response calculating parts 17 to 19.

Then, frequency spectrum signals of each of the receiver branches #1 to #n are, after being weighted by each of the weighting arithmetic parts 101 to 103, outputted to a the frequency spectrum combining part 104.

At the frequency spectrum combining part 104, a plurality of inputted frequency spectrum signals are combined into combined frequency spectrum signals and outputted to the demodulating part 105.

At the demodulating part 105, predetermined de-mapping processing or parallel/serial conversion is given to the inputted combined frequency spectrum signals to demodulate digital signal sequence transmitted.

Thus, with an apparatus for receiving OFDM diversity according to a second embodiment, it becomes possible not only to acquire the same advantages as the ones of the first embodiment but also to miniaturize each of the receiver branches #1 to #n by making a reference frequency spectrum generating part stand-alone from each of the receiver branches #1 to #n in order to integrate means to transform reference frequency spectrum signals into one.

Figure 3:
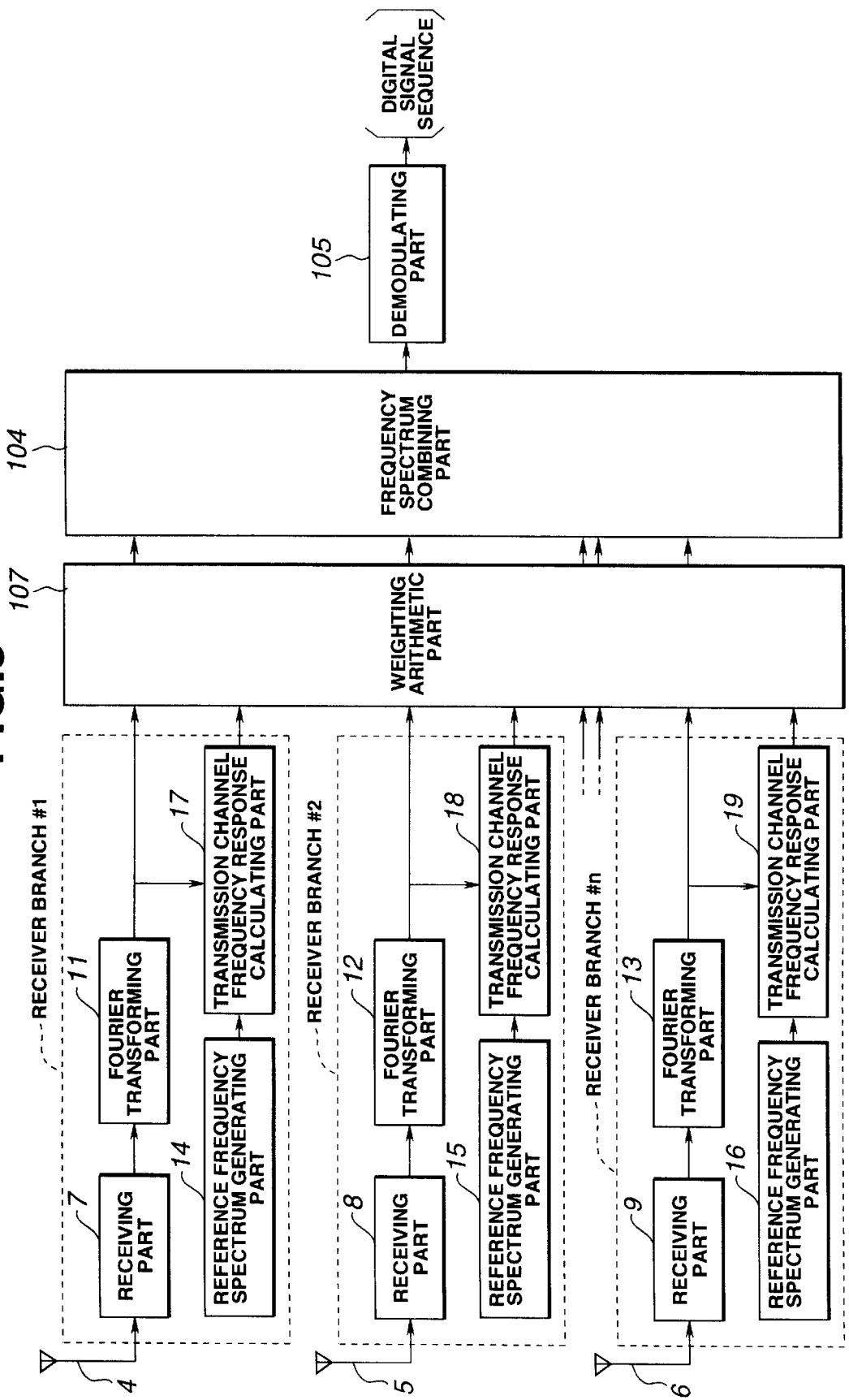
FIG. 3 shows a configuration of an apparatus for receiving OFDM diversity which is constructed in accordance with a third embodiment of the present invention.

An apparatus for receiving OFDM diversity constructed in accordance with a third embodiment of the present invention has been described with reference to FIG. 3. FIG. 3 shows a configuration of an apparatus for receiving OFDM diversity according to a third embodiment of the present invention.

This third embodiment is an example wherein the weighting arithmetic parts 101 to 103 in each of the receiver branches #1 to #n in the first embodiment is made stand-alone from the receiver branches #1 to #n to make one weighting arithmetic part 107.

In an apparatus for receiving OFDM diversity according to a third embodiment, in a similar manner to the above, OFDM transmission signals received at the antennas 4 to 6 are inputted to each of the receiving parts 7 to 9, converted into baseband signals, and inputted to each of the Fourier transforming parts 11 to 13.

At each of the Fourier transforming parts 11 to 13, baseband signals from each of the receiving parts 7 to 9 are converted into frequency spectrum signals through fast Fourier transformation, and outputted to the transmission channel frequency response calculating parts 17 to 19 and the weighting arithmetic part 107.

Meanwhile, at each of the reference frequency spectrum generating parts 14 to 16, reference frequency spectrum signals, which correspond to frequency spectrum signals converted by each of the Fourier transforming parts 11 to 13, are transformed and outputted to the transmission channel frequency response calculating parts 17 to 19.

At each of the transmission channel frequency response calculating parts 17 to 19, transmission channel frequency responses, which are characteristic of each of the receiver branches #1 to #n, are calculated using frequency spectrum signals inputted from each of the Fourier transforming parts 11 to 13 and the reference frequency spectrum signals inputted from each of the reference frequency spectrum generating parts 14 to 16, and outputted to the weighting arithmetic part 107.

At the weighting arithmetic part 107, frequency spectra from each of the Fourier transforming parts 11 to 13 are calculated their weighting for each spectrum on the basis of transmission channel frequency responses from each of the transmission channel frequency response calculating parts 17 to 19.

The series of processing in this stage is shown in the following simple mathematical expressions:

Here, the description will be given on a branch #i in the first place.

Frequency spectrum r(i, j) of OFDM transmission signals, which were received at an antenna of the first branch #1, then, underwent receiving processing and Fourier transforming processing, can be expressed as follows with (j) as spectrum number:

$$r(i, j) = h(i, j)s(j) + n(i, j) \tag{4}$$

Since reference frequency spectrum, which was transformed by a reference frequency spectrum generating part, is s(j), transmission channel frequency response $\underline{h}$(i, j), which is calculated at a frequency response calculating part, goes as follows:

$$\underline{h}(i, j) = r(i, j)s^*(j)/|s(j)|^2 \quad (5)$$

$$= h(i, j) + n(i, j)s^*(j)/|s(j)|^2$$

$$= h(i, j) + n'(i, j)$$

At the weighting arithmetic part 107, processing shown in equation (6) below is given, using equation (5), to the output of a Fourier transforming part after the time of equation (4), that is, to r(i, j):

$$r(i, j)\underline{h}^*(i, j) = s(j)|\underline{h}(i, j)|^2 + n''(i, j) \quad (6)$$

In this embodiment, although equation (4) is the same as equation (1), and equation (5) is the same as equation (2), equation (6) performs different processing from that of equation (3). This is a feature of this preferred embodiment. The symbol (n") in equation (6) is different from that in equation (3).

At the weighting arithmetic part 107, equation (6) calculated at each of the receiver branches #1 to #n, that is, the output from the Fourier transforming parts 11 to 13 of each of the receiver branches #1 to #n is multiplied by h*(i, j), and the multiplied result is given weighting arithmetic by being divided by total amount of power of transmission channel frequency responses which corresponds to equation (5) calculated at the transmission channel frequency response calculating parts 17 to 19 of each of the receiver branches #1 to #n.

Therefore, the output of the weighting arithmetic part 107 to the receiver branch #i in the i-th place goes as equation (7) below:

$$r'(i, j) = r(i, j)h^*(i, j)/\{\Sigma|h(i, j)|^2\} \quad (7)$$

Calculated results given by weighting arithmetic by the weighting arithmetic part 107, that is, (n) pieces of frequency spectrum signals of the receiver branches #1 to #n, are inputted to the frequency spectrum combining part 104 to be combined respectively.

The output of this frequency spectrum combining part 104, that is, combined frequency spectrum signals, is inputted to the demodulating part 105.

At the demodulating part 105, after predetermined demapping or parallel/serial transforming processing is carried out, digital signal sequence, which was transmitted from a transmitting source, is demodulated.

Thus, with the apparatus for receiving OFDM diversity according to a third embodiment, it is possible not only to acquire the same advantages as the ones of the first embodiment but also to miniaturize each of the receiver branches #1 to #n by making a plurality of the weighting arithmetic parts 101 to 103 stand-alone from the receiver branches #1 to #n to form one weighting arithmetic part 107.

That is, even when processing procedures are carried out in a different manner from the ones in the first embodiment, it is possible to realize reception of combined diversity and to improve reception characteristic with diversity reception.

Although the description in this third embodiment was given on an example wherein the reference frequency spectrum generating parts 14 to 16 are provided in each of the receiver branches #1 to #n, they may be integrated into one in a similar manner to the second embodiment (FIG. 2).

An apparatus for receiving OFDM diversity constructed in accordance with a fourth embodiment of the present invention has been described with reference to FIGS. 4 to 6.

Figure 4:
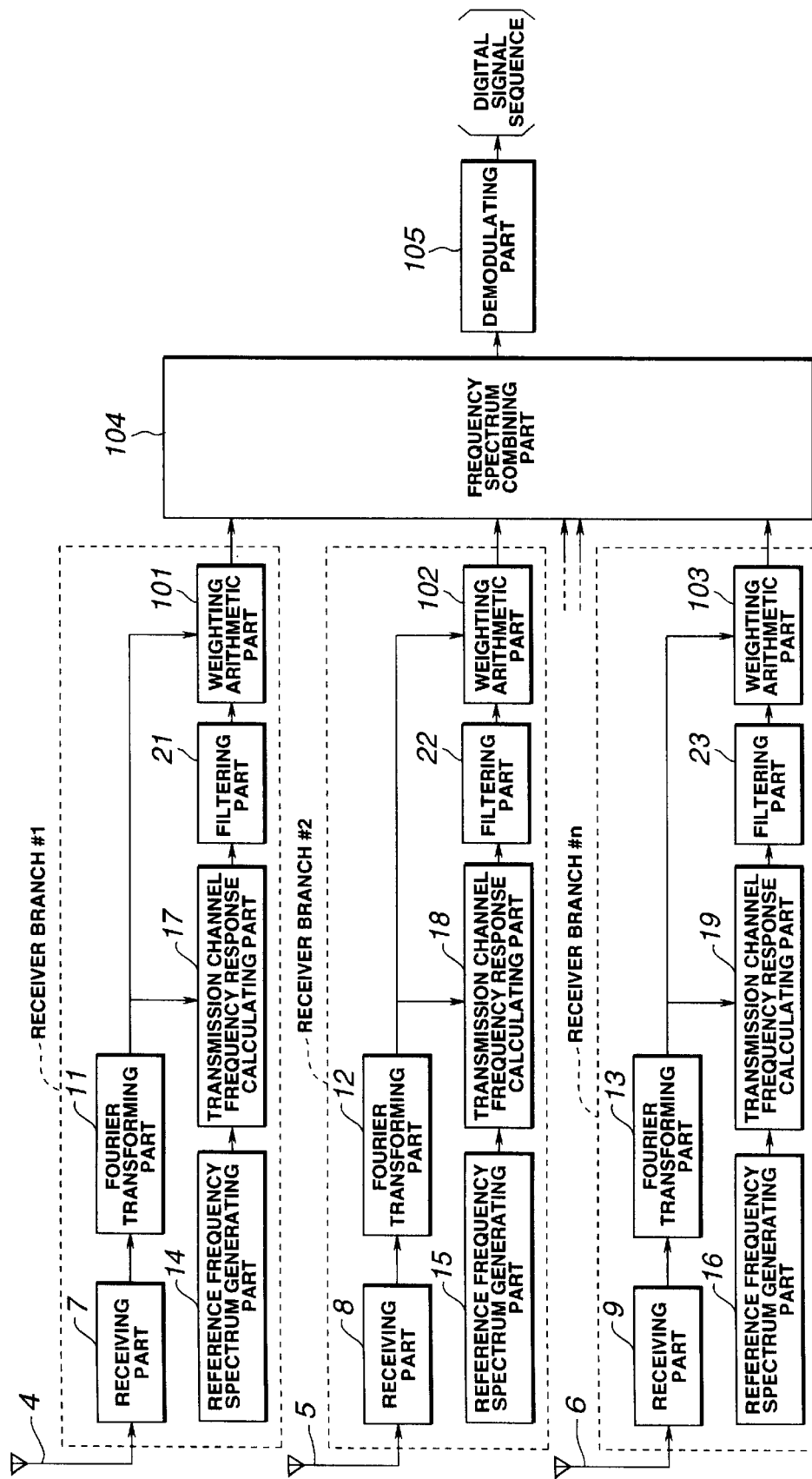
FIG. 4 shows a configuration of an apparatus for receiving OFDM diversity which is constructed in accordance with a fourth embodiment of the present invention.

FIG. 4 shows a configuration of an apparatus for receiving OFDM diversity constructed in accordance with a fourth embodiment of the present invention, FIG. 5 shows an exemplary configuration of a filtering part of this apparatus for receiving OFDM diversity, and FIG. 6 typically shows signals in the former stage and the latter stage of an inverse Fourier transforming part of the filtering part.

As shown in FIG. 4, an apparatus for receiving OFDM diversity according to a fourth embodiment has filtering parts 21 to 23 inserted between the transmission channel frequency response calculating parts 17 to 19 and the weighting arithmetic parts 101 to 103 in each of the receiver branches #1 to #n in the first embodiment.

Each of the filtering parts 21 to 23 is basically a processing means directly connected to the latter stage of the transmission channel frequency response calculating parts 17 to 19 of each of the receiver branches #1 to #n. To the latter stage of the filtering parts 21 to 23, the weighting arithmetic parts 101 to 103 are connected.

As shown in FIG. 5, the filtering part 21, for example, comprises an inverse Fourier transforming part 32, a propagation delay time measuring part 33, a filtering bandwidth setting part 34 and a filter 35.

To the inverse Fourier transforming part 32 and the filter 35, transmission channel frequency responses, which are inputted to the filtering part 21 from the transmission channel frequency response calculating part 17 attaching to the receiver branch #1, are inputted. The inverse Fourier transforming part 32 gives inverse Fourier transformation to inputted transmission channel frequency responses, to convert them into information in time domain, that is, into transmission channel time responses.

This transmission channel time response is also called transmission channel impulse response or delay profile. Delay profile generally stands for a bus number in a multipath radio wave propagating environment. The propagation delay time measuring part 33 measures a maximum delay time on the basis of inputted delay profile, and informs of measured results to the filtering bandwidth setting part 34. The filtering bandwidth setting part 34 determines bandwidth of the filter 35 on the basis of measured results informed, and sets the bandwidth on the filter 35. The filter 35 carries out filtering on the inputted transmission channel frequency responses in the band width which has been set up by the filtering bandwidth setting part 34, and outputs them to the weighting arithmetic part 101. Other filtering parts 22, 23 are also configured in a similar manner to this.

In this apparatus for receiving OFDM diversity according to a fourth embodiment, transmission channel frequency responses, which are calculated at the transmission channel frequency response calculating parts 17 to 19 of each of the receiver branches #1 to #n, are inputted to the weighting arithmetic parts 101 to 103 through the filtering parts 21 to 23. At the filtering parts 21 to 23, distortion in transmission channel frequency responses, which is caused by noises or other contamination at each of the receiving parts 7 to 9 respectively, is removed.

Figures 6A, 6B:
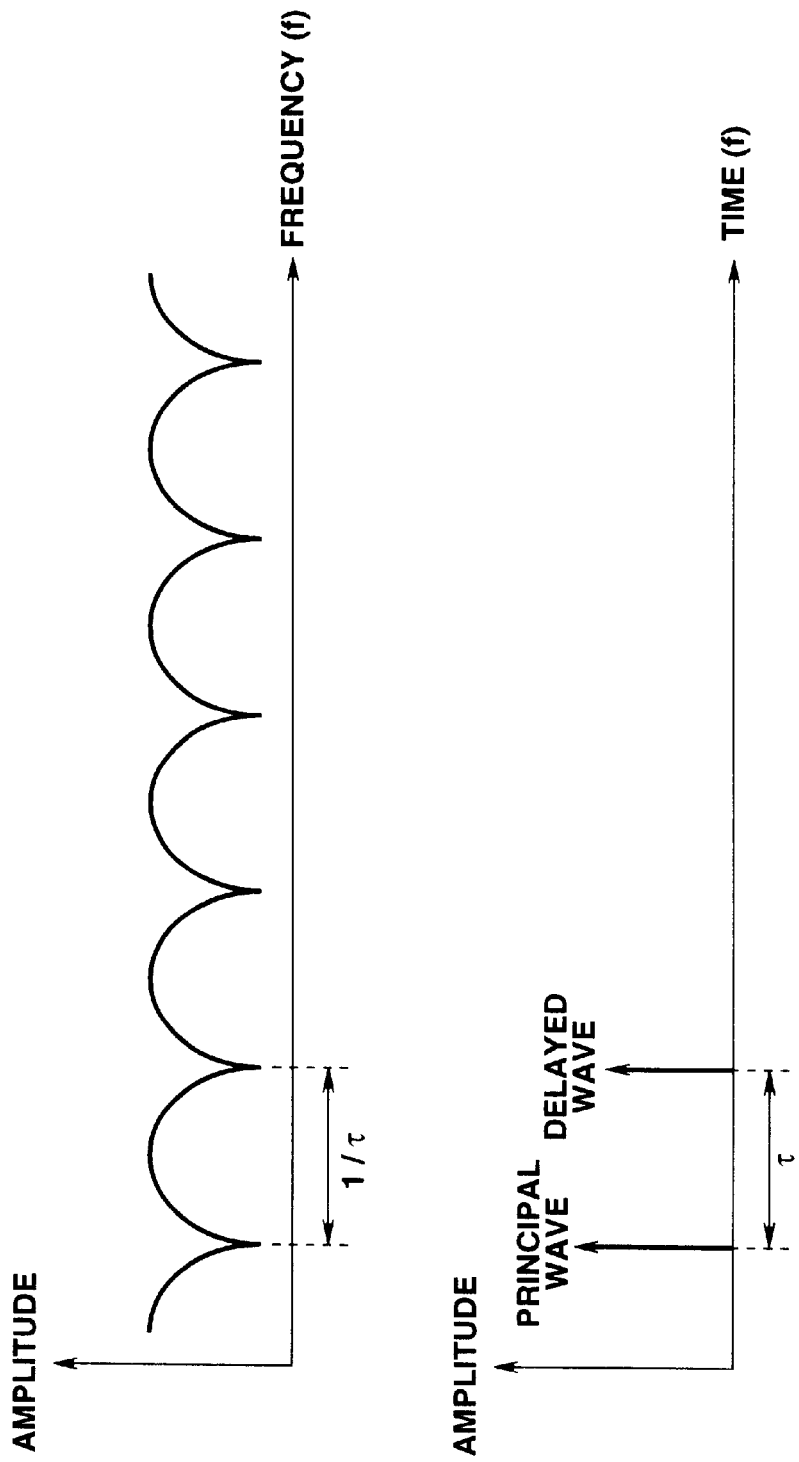
FIG. 6A shows a multipath transmission channel frequency response.
FIG. 6B shows a delay profile from the multipath transmission channel frequency response in FIG. 6A.

For example, transmission channel frequency responses, which are calculated at the transmission channel frequency response calculating part 17 attaching to the receiver branch #1, are, as shown in FIG. 6A, transmission channel frequency responses whose amplitude changes in a interval of $1/\tau$ in the direction of time base, and these transmission channel frequency responses are inputted to the inverse Fourier transforming part 32 of the filtering part 21 and the filter 35. This transmission channel frequency response occurs in an environment of multipath propagation to cause frequency selective fading distortion which becomes intervalic distortion.

When a transmission channel frequency response is inputted to the inverse Fourier transforming part 32, at the inverse Fourier transforming part 32, the transmission channel frequency response undergoes inverse Fourier transformation to be converted, as shown in FIG. 6B, into a transmission time response which is information in time domain consisting of a principal wave and a delay wave, which delays from the principal wave by the time($\tau$), that is, into delay profile.

When delay profile is inputted to the propagation delay time measuring part 33, at the propagation delay time measuring part 33, a maximum delay time is measured from the inputted delay profile. The result of maximum delay time measuring is informed to the filtering bandwidth setting part 34. At the filtering bandwidth setting part 34, a band width to be set up on the filter 35 is determined on the basis of informed maximum delay time, and the band width is set up on the filter 35.

Meanwhile, when a transmission channel frequency response is inputted to the filter 35, at the filter 35, the transmission channel frequency response undergoes filtering in the band width set up in said manner, and is outputted to the weighting arithmetic part 101.

That is, from the waveform shown in FIG. 6(*b*), propagation environment of radio waves can be grasped almost accurately at the filtering bandwidth setting part 34. By informing of it to the filtering bandwidth setting part 34, the band width of the filter 35 can be set up so as to remove components other than principal wave and delay wave.

In addition, by passing a transmission channel frequency response, which is output of the transmission channel frequency response calculating parts 17 to 19, to the filter 35 which has been set up for an adequate band width by the filtering bandwidth setting part 34, while unnecessary noise components in transmission channel frequency responses are suppressed, only necessary components become available to provide transmission channel frequency responses in more accurate values. As described above, since acquiring more accurate transmission channel frequency responses is indispensable to realization of adequate weighting processing, extremely satisfactorily combined diversity reception can be realized as a result.

The transmission channel frequency responses, from which distortion due to noises and others has been removed at each of the filtering parts 21 to 23, are inputted to the weighting arithmetic parts 101 to 103 to be given weighting arithmetic processing.

At each of the weighting arithmetic parts 101 to 103, each of the frequency spectra, which are output of the Fourier transforming parts 11 to 13 of each of the receiver branches #1 to #n, are weighted using each of the inputted transmission channel frequency responses, and outputted to the frequency spectrum combining part 104. That is, at these weighting arithmetic parts 101 to 103, weighting processing is carried out adequately for realizing combined diversity.

At the frequency spectrum combining part 104, frequency spectra from each of the receiver branches #1 to #n are combined, and the combined frequency spectra are inputted to the demodulating part 105. At the demodulating part 105, predetermined demapping or parallel/serial transforming processing is carried out, and the transmitted digital signal sequence is demodulated.

Thus, with the apparatus for receiving OFDM diversity according to a fourth embodiment, it becomes possible not only to acquire the same advantages as the ones of the first embodiment but also, by inserting the filtering parts 21 to 23 between the transmission channel frequency response calculating part 17 to 19 and the weighting arithmetic parts 101 to 103, to remove distortion due to noises or others from transmission channel frequency responses calculated at each of the receiver branches #1 to #n, to make transmission channel frequency responses more accurate, and to realize adequate weighting processing in the latter stage of the weighting arithmetic parts 101 to 103.

That is, by having the filtering parts 21 to 23, even under propagation environment where delay time may change, distortion, which are attached to transmission channel frequency responses, such as noises, can be removed efficiently and effectively to make more accurate transmission channel frequency responses available.

Owing to this, weighting processing at each of the receiver branches #1 to #n is now carried out desirably to execute combined diversity reception securely by removing distortion in transmission channel frequency responses.

Although this fourth embodiment is based on the first embodiment, naturally, configuration, wherein the filtering parts 21 to 23 are inserted between the transmission channel frequency response calculating parts 17 to 19 and the weighting arithmetic parts 101 to 103, is also effective to a second and third embodiments.

Consequently, more accurate combined diversity reception can be realized. In addition, realization of this diversity reception improves reception characteristic. Moreover, even in a poor environment for radio propagation, transmission of information in high quality can be realized.

A description will now be given on an apparatus for receiving OFDM diversity constructed in accordance with a fifth embodiment of the present invention with reference to FIGS. 7 and 8. FIG. 7 shows a configuration of an apparatus for receiving OFDM diversity according to a fifth embodiment of the present invention, and FIG. 8 shows an exemplary configuration of an amplitude correcting part of this apparatus for receiving OFDM diversity.

As shown in FIG. 7, this apparatus for receiving OFDM diversity according to a fifth embodiment is a modification of the apparatus for receiving OFDM diversity according to the first embodiment (FIG. 1), wherein an amplitude correcting part 108 is inserted between the frequency spectrum combining part 104 and the demodulating part 105. This amplitude correcting part 108 corrects amplitude of combined frequency spectra combined by the frequency spectrum combining part 104.

As shown in FIG. 8, the amplitude correcting part 108 has power calculating parts 46 to 48, an adding part 410, a dividing part 411, and others.

The power calculating parts 46 to 48 calculate power of transmission channel frequency responses calculated respectively by the transmission channel frequency response calculating parts 17 to 19 of each of the receiver branches #1 to #n. The adding part 410 adds value of power of transmission channel frequency responses calculated for each spectrum at each of the power calculating parts 46 to 48 to find accumulated value of power. The dividing part 411 normalizes combined frequency spectrum signals by dividing accumulated value of power, which was added by the adding part 410 and combined frequency spectrum signals inputted from the frequency spectrum combining part 104.

Although this apparatus for receiving OFDM diversity according to the fifth embodiment is based on the configuration of the first embodiment and the basic operation of each of the receiver branches #1 to #n is almost the same in both embodiments, the operation of the weighting arithmetic parts 101 to 103 is a little different from that described in the first embodiment. A brief description will be given on that point hereinafter.

In this description, the object is a receiver branch #i in the i-th place.

When frequency spectrum of OFDM transmission signals, which have been received at the receiver branch #i and converted by a Fourier transforming part therein, is r(i, j), the operation can be expressed as follows with (j) expressing the spectrum number:

$$r(i, j)=h(i, j)s(j)+n(i, j) \tag{8}$$

Since reference frequency spectrum, which has been transformed by a reference frequency spectrum generating part, is s(j), transmission channel frequency response h(i, j) calculated at a transmission channel frequency response calculating part goes as follows:

$$\underline{h}(i, j) = r(i, j)s^*(j)/|s(j)|^2 \tag{9}$$
$$= h(i, j) + n(i, j)s^*(j)/|s(j)|^2$$
$$= h(i, j) + n'(i, j)$$

At a weighting arithmetic part, calculating processing of equation (10) below is given, using equation (9), to output r(i, j) of a Fourier transforming part after the time of equation (8).

$$r(i, j)\underline{h}^*(i, j)=s(j)|\underline{h}(i, j)|^2+n''(i,j) \tag{10}$$

Where, n''(i, j)=n(i, j)$\underline{h}^*$(i, j).

Accordingly, output of the frequency spectrum combining part 104, r'(i, j) goes as follows:

$$r'(i, j) = \sum r(i, j)\underline{h}^*(i, j) \tag{11}$$
$$= \sum |\underline{h}(i, j)|^2 s(j) + \sum n''(i, j)$$

Consequently, at the amplitude correcting part 108, processing is executed by dividing Expression (11) by $\Sigma|\underline{h}(i, j)|^2$.

In order to realize this processing at the amplitude correcting part 108, at this amplitude correcting part 108, not only combined frequency spectrum signals from the frequency spectrum combining part 104 but also transmission channel frequency response $\underline{h}$(i, j) calculated at the transmission channel frequency response calculating parts 17 to 19 of each of the receiver branches #1 to #n are used.

The transmission channel frequency responses calculated by the transmission channel frequency response calculating parts 17 to 19 attaching to each of the receiver branches #1 to #n are inputted to each of the power calculating parts 46 to 48 of the amplitude correcting part 108. Each of the power calculating parts 46 to 48 calculates power of the inputted transmission channel frequency responses for each spectrum. Power calculated for each spectrum by each of the power calculating parts 46 to 48 is inputted to the adding part 410 to be added for each spectrum to find an amplitude correction value.

That is, at this adding part 410, power value of the k-th spectrum of transmission channel frequency response obtained at the receiver branch #i in the i-th place and power value of the k-th spectrum of transmission channel frequency response obtained at a receiver branch #j in the j-th place are added to make an amplitude correction value. Amplitude correction values obtained in this manner are outputted to the dividing part 411.

To the dividing part 411, since combined frequency spectrum signals from a frequency spectrum combining part 40 are inputted, this combined frequency spectrum signals are divided by the amplitude correction value. The frequency spectrum signal resulted from this dividing is outputted to the demodulating part 105.

Combined frequency spectra, which have been given amplitude correction for each spectrum by the amplitude correcting part 108 in this manner, are inputted to the demodulating part 105.

At the demodulating part 105, predetermined demapping or parallel/serial transforming processing is given to inputted frequency spectrum signals resulted from dividing, and digital signal sequence transmitted is demodulated.

Thus, with an apparatus for receiving OFDM diversity according to a fifth embodiment, more accurate digital signal sequence can be demodulated at the demodulating part 105, by inserting the amplitude correcting part 108 between the frequency spectrum combining part 104 and the demodulating part 105, and by correcting amplitude of combined frequency spectrum combined by the frequency spectrum combining part 104 using transmission channel frequency responses outputted from each of the receiver branches #1 to #n.

As a result, more accurate combined diversity reception can be realized. In addition, realization of this diversity reception improves reception characteristic. Moreover, transmission of information in high quality can be realized even in a poor environment for radio propagation.

Though functions of the weighting arithmetic parts 101 to 103 described in this fifth embodiment turn out to be the same as the ones of the weighting arithmetic part 107 of a third embodiment shown in FIG. 3, the difference from the third embodiment is whether this amplitude correcting part 108 is arranged in the former stage of the frequency spectrum combining part 104 or in the latter stage thereof. When the amplitude correcting part 108 is arranged in the former stage of the frequency spectrum combining part 104, it is possible to include functions of this amplitude correcting part 108 in the weighting arithmetic parts 101 to 103 attaching to each of the receiver branches #1 to #n. Therefore a third embodiment does not dare to give a stand-alone configuration to the amplitude correcting part 108.

Similarly, although the description in this fifth embodiment was given on an example wherein the reference frequency spectrum generating parts 14 to 16 are provided in each of the receiver branches #1 to #n respectively, they may be integrated into one as the example in a second embodiment (FIG. 2).

Next description will be given on an apparatus for receiving OFDM diversity constructed in accordance with a sixth embodiment of the present invention with reference to FIG. 9. FIG. 9, shows a configuration of an apparatus for receiving OFDM diversity constructed in accordance with a sixth embodiment of the present invention.

As shown in FIG. 9, this apparatus for receiving OFDM diversity according to a sixth embodiment has a plurality of the receiver branches #1 to #n, a frequency spectrum combining part 104 for combining frequency spectrum signals outputted from each of the receiver branches #1 to #n, an amplitude correcting part 108 for correcting an amplitude of combined frequency spectrum signals combined by this frequency spectrum combining part 104, and a demodulating part 105 for demodulating digital signal sequence from combined frequency spectrum signals which have been corrected by this amplitude correcting part 108.

The receiver branch #1 has an antenna 4, a receiving part 7, a Fourier transforming part 11, a reference frequency spectrum generating part 14, a transmission channel frequency response calculating part 17, a filtering part 21, and a weighting arithmetic part 101. The receiver branch #2 has an antenna 5, a receiving part 8, a Fourier transforming part 12, a reference frequency spectrum generating part 15, a transmission channel frequency response calculating part 18, a filtering part 22, and a weighting arithmetic part 102. The receiver branch #n has an antenna 6, a receiving part 9, a Fourier transforming part 13, a reference frequency spectrum generating part 16, a transmission channel frequency response calculating part 19, a filtering part 23, and a weighting arithmetic part 103.

In this apparatus for receiving OFDM diversity according to a sixth embodiment, at each of the receiver branches #1 to #n, OFDM transmission signals received at the antennas 4 to 6 are given receiving processing at the receiving parts 7 to 9. At the receiving parts 7 to 9, various means are provided, such as the ones necessary to perform frequency conversion of signals in RF frequency into baseband signals (to amplify, to mix frequencies, and to limit frequency band), synchronizing means, frequency correcting means, and means for removing the guarded interval, which is characteristic of the OFDM transmission system. From each of the receiving parts 7 to 9, baseband signals, from which guarded intervals have been removed, are outputted. Baseband signals outputted from the receiving parts 7 to 9 are inputted to the Fourier transforming parts 11 to 13, undergo fast Fourier transforming processing, then, are converted into frequency spectra. At the reference frequency spectrum generating parts 14 to 16, frequency spectra for reference, which correspond to frequency spectra to be converted by the Fourier transforming parts 11 to 13, are transformed and outputted to the transmission channel frequency response calculating parts 17 to 19.

At each of the transmission channel frequency response calculating parts 17 to 19, using each of the inputted frequency spectra and reference frequency spectra, a transmission channel frequency response, which is characteristic of each of the receiver branches #1 to #n, is calculated. Transmission channel frequency responses calculated at the transmission channel frequency response calculating parts 17 to 19 of each of the receiver branches #1 to #n are outputted to the weighting arithmetic parts 101 to 103 respectively through the filtering parts 21 to 23.

At the filtering parts 21 to 23, distortion in transmission channel frequency responses, which is due to noise or others at each of the receiving parts 7 to 9, is removed. And, from the filtering parts 21 to 23, transmission channel frequency responses, from which distortion such as noises has been removed, are outputted to the weighting arithmetic parts 101 to 103 respectively.

At each of the weighting arithmetic parts 101 to 103, frequency spectrum signals, which are output from the Fourier transforming parts 11 to 13 of each of the receiver branches #1 to #n, undergo weighting processing and are outputted to the frequency spectrum combining part 104.

At the frequency spectrum combining part 104, frequency spectrum signals from each branch are combined into combined frequency spectrum which is outputted to the amplitude correcting part 108.

At the amplitude correcting part 108, amplitude of combined frequency spectrum signals is corrected, and the corrected frequency spectrum is outputted to the demodulating part 105.

At the demodulating part 105, predetermined demapping or parallel/serial transforming processing is carried out on the basis of combined frequency spectrum signals, which have been inputted and had their amplitude corrected, and transmitted digital signal sequence is demodulated.

Contents of each processing at the weighting arithmetic parts 101 to 103 and at the amplitude correcting part 108 are not described in detail in particular, because the filtering parts 21 to 23 shown in this sixth embodiment are the same as the ones in a fourth embodiment shown in FIG. 4 and FIG. 5, and the amplitude correcting parts 108 shown in this sixth embodiment is the same as the one in the fifth embodiment shown in FIGS. 7 and 8.

As stated above, with this apparatus for receiving OFDM diversity according to the sixth embodiment, transmission channel frequency responses become more accurate by configuring so that transmission channel frequency response, which has been calculated at the transmission channel frequency response calculating parts 17 to 19 of each of the receiver branches #1 to #n, are outputted to the weighting arithmetic parts 101 to 103 through the filtering parts 21 to 23 so as to correct distortion in transmission channel frequency responses. Thus, weighting processing can be executed adequately at the weighting arithmetic parts 101 to 103. Besides, by configuring it so that output of the frequency spectrum combining part 104 is inputted to the demodulating part 105 through the amplitude correcting part 108, combined frequency spectrum combined at the frequency spectrum combining part 104 becomes more accurate. This multiplier effect of the amplitude correcting part 108 and the filtering parts 21 to 23 enables the acquisition of a more accurate digital signal sequence.

As a result, even when high efficiency modulating system is used, combined diversity reception can be realized more accurately. In addition, with this realization of this diversity reception, improvement of reception characteristic comes within range. Moreover, transmission of information in high quality is realizable even in a poor environment for radio propagation.

Although, in this sixth embodiment, the description has been given on an example wherein the reference frequency spectrum generating parts 14 to 16 are arranged in each of the receiver branches #1 to #n respectively, they may be integrated into one as they are in the second embodiment (FIG. 2).

Figure 10:
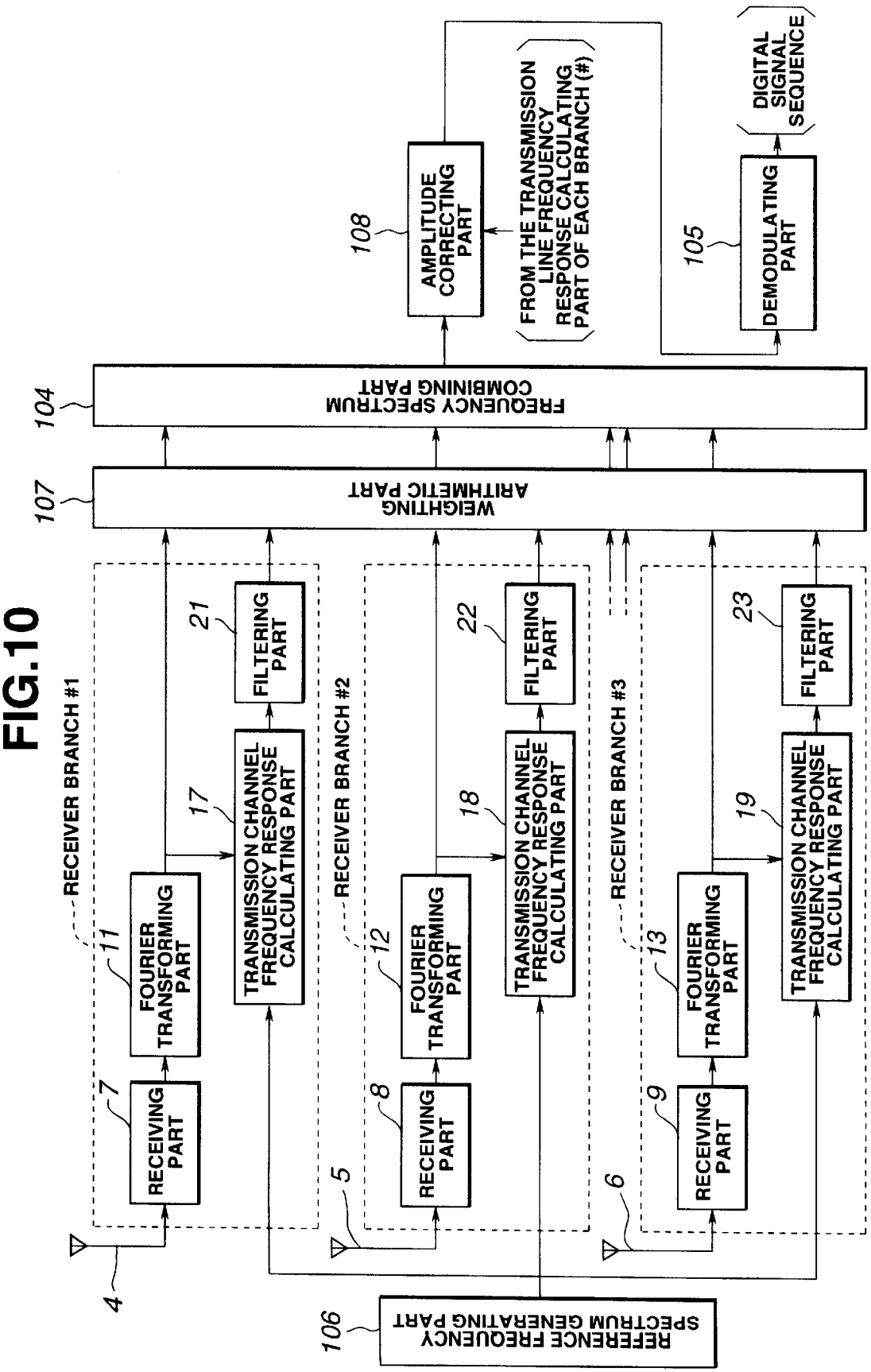
FIG. 10 shows a configuration of an apparatus for receiving OFDM diversity which is constructed in accordance with a seventh embodiment of the present invention.

Next description will be given on an apparatus for receiving OFDM diversity constructed in accordance with a seventh embodiment of the present invention with reference to FIG. 10. FIG. 10 shows a configuration of an apparatus for receiving OFDM diversity constructed in accordance with a seventh embodiment of the present invention. This seventh embodiment is a modification of the sixth embodiment.

As the figure shows, this apparatus for receiving OFDM diversity according to the seventh embodiment has a plurality of the receiver branches #1 to #n, a reference frequency spectrum generating part 106 to output reference frequency spectrum signals to each of the receiver branches #1 to #n, a weighting arithmetic part 107 to carry out weighting arithmetic on frequency spectrum signals outputted from each of the receiver branches #1 to #n using transmission channel frequency responses outputted from each of the receiver branches #1 to #n, a frequency spectrum combining part 104 to combine frequency spectrum signals outputted from this weighting arithmetic part 107, an amplitude correcting part 108 to correct amplitude of combined frequency spectrum signals combined by this frequency spectrum combining part 104, and a demodulating part 105 to demodulate digital signal sequence from combined frequency spectrum signals which have been corrected by this amplitude correcting part 108.

That is, this seventh embodiment is an example wherein a weighting arithmetic part and a reference frequency spectrum generating part are made stand-alone from each of the receiver branches #1 to #n in the configuration of the sixth embodiment.

In case of this apparatus for receiving OFDM diversity according to the seventh embodiment, OFDM transmission signals received at the antennas 4 to 6 are inputted to each of the receiving parts 7 to 9, converted into baseband signals, and inputted to each of the Fourier transforming parts 11 to 13.

At each of the Fourier transforming parts 11 to 13, baseband signals from each of the receiving parts 7 to 9 undergo fast Fourier transformation to be converted into frequency spectrum signals, then, are outputted to each of the transmission channel frequency response calculating parts 17 to 19 and the weighting arithmetic part 107.

Meanwhile, at the reference frequency spectrum generating part 106, reference frequency spectrum signals, which correspond to frequency spectrum signals transformed by the Fourier transforming parts 11 to 13, are transformed and outputted to each of the transmission channel frequency response calculating parts 17 to 19.

At each of the transmission channel frequency response calculating parts 17 to 19, a transmission channel frequency response, which is characteristic of each of the receiver branches #1 to #n, is calculated using frequency spectrum signals inputted from each of the Fourier transforming parts 11 to 13 and reference frequency spectrum signals inputted from the reference frequency spectrum generating part 106, and is outputted to the weighting arithmetic part 107 through the filtering parts 21 to 23. At the filtering parts 21 to 23, distortion in the transmission channel frequency responses is removed.

At the weighting arithmetic part 107, each of the frequency spectrum signals from each of the receiver branches #1 to #n undergoes weighting for each spectrum on the basis of transmission channel frequency responses after filtering inputted from each of the receiver branches #1 to #n. Each of the frequency spectrum signals after weighting processing is outputted to the frequency spectrum combining part 104.

At the frequency spectrum combining part 104, each weighted frequency spectrum signal is combined into combined frequency spectrum which is outputted to the amplitude correcting part 108.

At the amplitude correcting part 108, amplitude of combined frequency spectrum signals is corrected, and the corrected frequency spectrum is outputted to the demodulating part 105.

At the demodulating part 105, predetermined demapping or parallel/serial transforming processing is carried out on the basis of combined frequency spectrum signals, which have been inputted and underwent amplitude correction to demodulate transmitted digital signal sequence.

With this apparatus for receiving OFDM diversity according to the seventh embodiment, not only the same advantage as that of the sixth embodiment is acquired, but also each of the receiver branches #1 to #n can be miniaturized by making the weighting arithmetic part 107 and the reference frequency spectrum generating part 104 stand-alone from each of the receiver branches #1 to #n.

Figure 11:
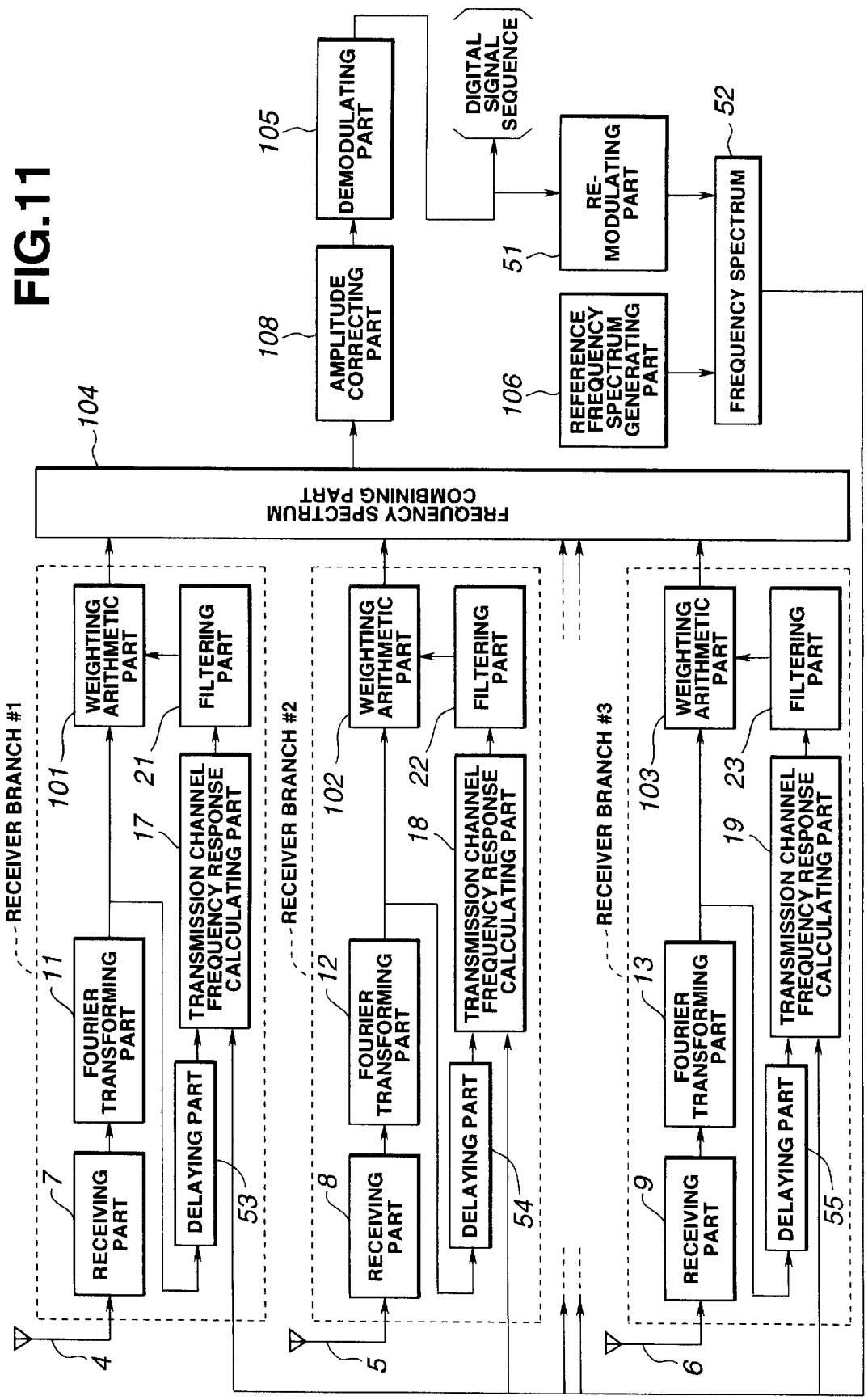
FIG. 11 shows a configuration of an apparatus for receiving OFDM diversity which is constructed in accordance with an eighth embodiment of the present invention.

Next, a description will be given on an apparatus for receiving OFDM diversity constructed in accordance with an eighth embodiment of the present invention with reference to FIG. 11. FIG. 11 shows a configuration of an apparatus for receiving OFDM diversity constructed in accordance with an eighth embodiment of the present invention. This eighth embodiment is a modification of the sixth embodiment, particularly a configuration example for mobile reception environment taken into account. Mobile reception environment is a communication system or broadcasting system wherein digital signal sequence is transmitted in the OFDM transmission system which has used slot configuration.

That is, as shown in FIG. 11, this apparatus for receiving OFDM diversity according to an eighth embodiment has delaying parts 53 to 55 to delay frequency spectrum signals from each of the Fourier transforming parts 11 to 13 provided inside of each of the receiver branches #1 to #n, and outside thereof, a re-modulating part 51 to re-modulate digital signal sequence, which has been demodulated at the demodulating part 105, into frequency spectrum signals, and a frequency spectrum selecting part 52 to select either of frequency spectrum signals re-modulated by this re-modulating part 51 or output from the reference frequency spectrum generating part 106 provided. The frequency spectrum selecting part 52, while it generally selects frequency spectrum signals, which were digital signal sequence demodulated at the demodulating part 105 before being re-modulated at the re-modulating part 51, and outputs them to the transmission channel frequency response calculating parts 17 to 19, it selects output from the reference frequency spectrum generating part 106 and outputs it to the transmission channel frequency response calculating parts 17 to 19 when OFDM transmission signals of known data system is received at the receiving parts 7 to 9.

In case of this apparatus for receiving OFDM diversity, in the communication system or broadcasting system, known data system is supposed to be transmitted being put at the nose of a slot to be radio-transmitted in the OFDM system, for example, in predetermined time intervals. And when OFDM transmission signals containing this known data system are received at the receiving parts 7 to 9, reference frequency spectrum signals, which correspond to the known data system, are transformed at the reference frequency spectrum generating part 106.

Reference frequency spectrum signals transformed at this reference frequency spectrum generating part 106 are inputted to the transmission channel frequency response calculating parts 17 to 19 through the spectrum selecting part 52.

Besides, when OFDM transmission signals containing known data system are received, frequency spectrum signals converted by each of the Fourier transforming parts 11 to 13 are inputted to the transmission channel frequency response calculating parts 17 to 19 without being delayed by the delaying parts 53 to 55.

At the transmission channel frequency response calculating parts 17 to 19, transmission channel frequency responses are calculated from inputted reference frequency spectrum signals and frequency spectrum signals converted by the Fourier transforming parts 11 to 13.

When OFDM transmission signals containing data system other than known data system are received at the receiving parts 7 to 9, frequency spectrum signals, which have been converted by the Fourier transforming parts 11 to 13 of each of the receiver branches #1 to #n, are inputted to the transmission channel frequency response calculating parts 17 to 19 after being delayed for a predetermined time, for example, for one unit of data symbol time, by the delaying parts 53 to 55.

Meanwhile, digital signal sequence demodulated at the demodulating part 105 is re-modulated by the re-modulating part 51 into frequency spectrum signals. For this re-modulating processing, it usually takes one unit of data symbol time. And they are inputted to the transmission channel frequency response calculating parts 17 to 19 after being delayed for this amount of time.

Consequently, to the transmission channel frequency response calculating parts 17 to 19, frequency spectrum signals inputted from each of the delaying parts 53 to 55 and frequency spectrum signals outputted from the re-modulating part 51 are synchronized and inputted. Transmission channel frequency responses are calculated from these spectrum signals.

Transmission channel frequency responses calculated at each of the transmission channel frequency response calculating parts 17 to 19 are outputted to the weighting arithmetic parts 101 to 103 through the filtering parts 21 to 23. At each of the filtering parts 21 to 23, distortion in transmission channel frequency responses due to noises or others in each of the receiving parts 7 to 9, is removed. And, from the filtering parts 21 to 23, transmission channel frequency responses, from which distortion has been removed, are inputted to the weighting arithmetic parts 101 to 103.

At the weighting arithmetic parts 101 to 103, weighting processing is given to frequency spectrum signals, which are output of the Fourier transforming parts 11 to 13, using inputted transmission channel frequency responses after removal of distortion. Since the processing of the weighting arithmetic parts 101 to 103 is the same as the content described in each of the preceding embodiments, its description is omitted.

Frequency spectrum signals weighted respectively by the weighting arithmetic parts 101 to 103 of each of the receiver branches #1 to #n are outputted to the frequency spectrum combining part 104.

At the frequency spectrum combining part 104, frequency spectrum signals from each of the receiver branches #1 to #n are combined for each spectrum into combined frequency spectrum signals and outputted to the amplitude correcting part 108.

At the demodulating part 105, predetermined demapping or parallel/serial transforming processing is carried out on the basis of inputted frequency spectrum signals, and digital signal sequence, which a transmitting source transmitted, is demodulated and inputted to the re-modulating part 51 and others.

Thus, in a system, where signals are radio-transmitted in such a slot configuration as containing known data system at the nose of slot, data system other than known data system is given modulating processing again at the re-modulating part 51, and inputted to the transmission channel frequency response calculating parts 17 to 19 of each of the receiver branches #1 to #n through the frequency spectrum selecting part 52. This processing is generally called a decision directed processing, and carried out repeatedly.

That is, transmission channel frequency responses are calculated from frequency spectrum of digital signal sequence demodulated at time (k) and frequency spectrum of OFDM transmission signals received at time (k). On the basis of this transmission channel frequency response, weighting is given to output of the Fourier transforming parts 11 to 13 at the time (k+1).

In this manner, for this apparatus for receiving OFDM diversity according to an eighth embodiment, at the transmission channel frequency response calculating parts 17 to 19, while, when known data system is received, transmission channel frequency responses are calculated from frequency spectrum signals inputted from the Fourier transforming parts 11 to 13 through the delaying parts 53 to 55 and reference frequency spectrum signals from the frequency spectrum selecting part 52, and when data system other than known data system is received, transmission channel frequency responses are calculated from frequency spectrum signals delayed for a predetermined time by the delaying parts 53 to 55 and frequency spectrum signals which are re-modulated digital signal sequence demodulated by the demodulating part 105. Accordingly, even under dynamic propagation environment for radio waves, such as mobile reception environment, updated transmission channel frequency responses can be calculated at each of the receiver branches #1 to #n, and adequate weighting processing, which is indispensable for combined diversity, can be carried out more accurately.

As a result, more accurate combined diversity reception is realized. Besides, realization of this diversity reception improves reception characteristic. Moreover, even in a poor environment for radio propagation, transmission of information can be realized in high quality.

Figure 12:
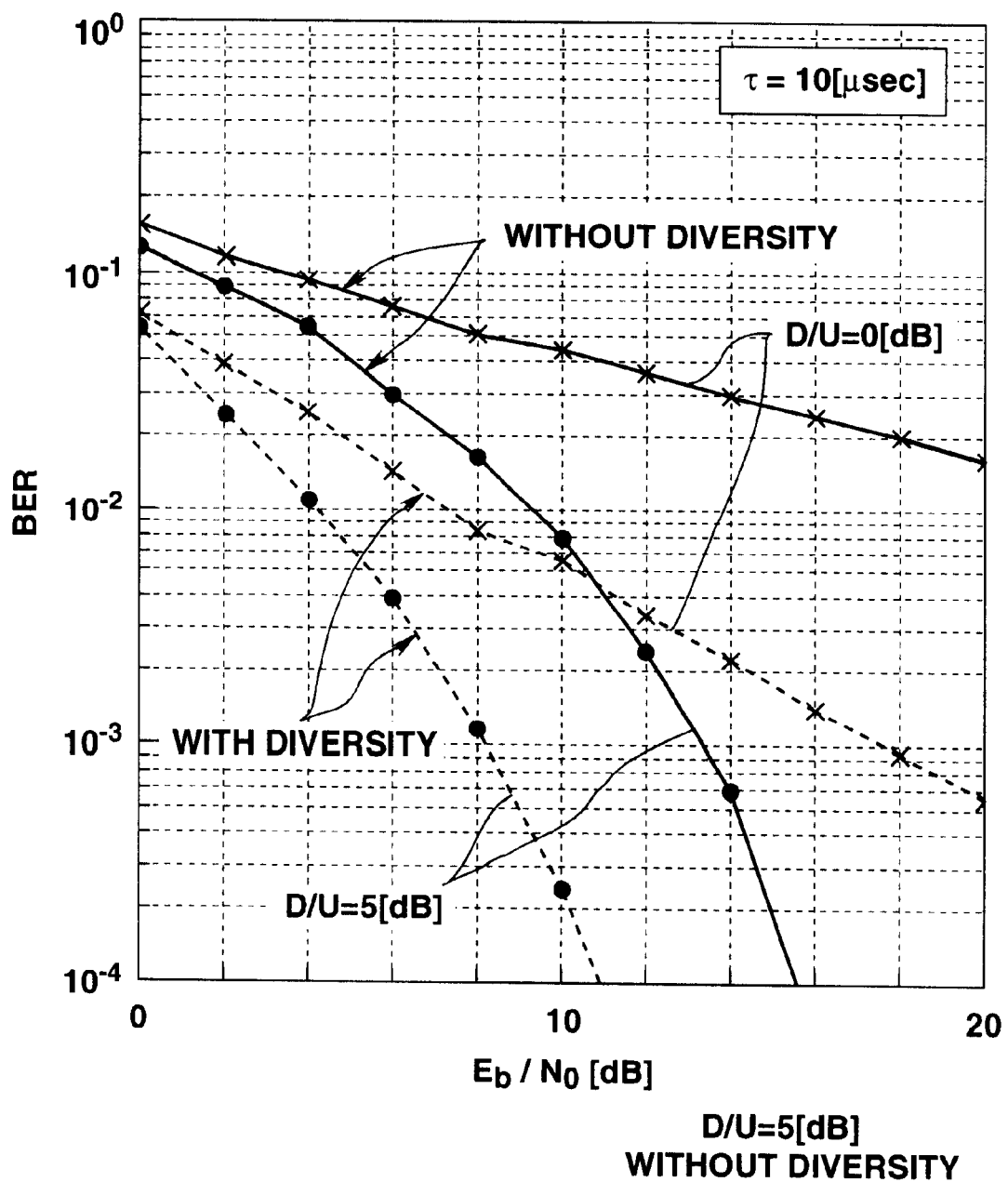
FIG. 12 shows a bit error rate characteristic which is the result of the reception characteristic evaluation of an apparatus for receiving OFDM diversity which is constructed in accordance with the eighth embodiment.

Now, a description will be given on advantages of the apparatus for receiving OFDM diversity according to an eighth embodiment with reference to FIG. 12. FIG. 12 is a bit error rate characteristic diagram based on the apparatus for receiving OFDM diversity according to an eighth embodiment, that is, a reception characteristic diagram.

The bit error rate characteristic in FIG. 12 is a result when Eb/N0 (dB) is defined as the horizontal axis, bit error rate as the vertical axis, and independent two path waves are evaluated under multipath propagation environment.

In the figure, (τ) indicates incoming time difference between two waves (principal incoming wave and delayed incoming wave), and D/U (dB) indicates power ratio of a principal incoming wave and a delayed incoming wave.

In this figure, a case wherein D/U (dB) is 0 (dB) and another case wherein it is 5 (dB) are shown respectively. In either D/U (dB), it is apparent that this apparatus for receiving OFDM diversity improves reception characteristic significantly.

Concerning the present invention, it is obvious that different preferred embodiments in a wide range can be configured on the basis of the present invention without any departure from the spirit and scope of the present invention. The present invention should not be limited only to specific preferred embodiments thereof, except limited by the appended claims.

What is claimed is:

1. A method of receiving diversity comprising:
a receiving step for receiving orthogonal frequency division multiplexing signals;
a frequency transforming step for obtaining a plurality of frequency spectrum signals through frequency transforming of said orthogonal frequency division multiplexing signals;
a weighting step for carrying out weighting on frequency spectrum signals obtained from said frequency transforming step based on transmission channel frequency responses obtained from said frequency spectrum signals;
a combining step for obtaining combined frequency spectrum signals by combining a plurality of said frequency spectrum signals;
a demodulating step for demodulating digital signal sequence from said combined frequency spectrum signals;
a step for generating reference frequency spectrum signals for reference,
wherein said transmission channel frequency responses are calculated on the basis of said frequency spectrum signals and said reference frequency spectrum signals; and a filtering step for removing noise component contained in said transmission channel frequency responses, wherein said weighting step carries out weighting on each of said frequency spectrum signals or said combined frequency spectrum signals on the basis of transmission channel frequency responses from which noise component has been removed by said filtering step, and wherein said filtering step comprises:
- a step for transforming said transmission channel frequency responses into transmission channel time responses,
- a step for measuring propagation time delay in the environment of multipath reflection of wave propagation, using said transmission channel time responses, and
- a step, in which a band width has been set up so as to remove noises on the basis of said propagation delay time, for carrying out filtering on said transmission channel frequency responses.

2. A method of receiving diversity comprising:

a receiving step for receiving orthogonal frequency division multiplexing signals;

a frequency transforming step for obtaining a plurality of frequency spectrum signals through frequency transforming of said orthogonal frequency division multiplexing signals;

a weighting step for carrying out weighting on frequency spectrum signals obtained from said frequency transforming step based on transmission channel frequency responses obtained from said frequency spectrum signals;

a combining step for obtaining combined frequency spectrum signals by combining a plurality of said frequency spectrum signals;

a demodulating step for demodulating digital signal sequence from said combined frequency spectrum signals;

a step for generating reference frequency spectrum signals for reference, wherein said transmission channel frequency responses are calculated on the basis of said frequency spectrum signals and said reference frequency spectrum signals; and an amplitude correcting step for carrying out amplitude correction on said combined frequency spectrum signals for each spectrum using said transmission channel frequency responses, wherein said amplitude correcting step comprises:
- a step for finding accumulated value of power by adding power of each of the transmission channel frequency responses obtained from a plurality of said frequency spectrum signals, and
- a normalizing step for normalizing said combined frequency spectrum signals using said accumulated value of power.

3. A method of receiving diversity comprising:

a receiving step for receiving orthogonal frequency division multiplexing signals;

a frequency transforming step for obtaining a plurality of frequency spectrum signals through frequency transforming of said orthogonal frequency division multiplexing signals;

a weighting step for carrying out weighting on frequency spectrum signals obtained from said frequency transforming step based on transmission channel frequency responses obtained from said frequency spectrum signals;

a combining step for obtaining combined frequency spectrum signals by combining a plurality of said frequency spectrum signals;

a demodulating step for demodulating digital signal sequence from said combined frequency spectrum signals;

a re-modulating step for obtaining frequency spectrum signals by re-modulating digital signal sequence from said demodulating step; and a delaying step for delaying said frequency spectrum signals obtained by said frequency transforming step when data system other than known data system is received, wherein said transmission channel frequency responses are calculated on the basis of frequency spectrum signals obtained by said delaying step and frequency spectrum signals obtained by said re-modulating step.

4. A method of receiving diversity according to claim 3, comprising:

a filtering step for removing noise component contained in said transmission channel frequency responses, wherein said weighting step carries out weighting on each of said frequency spectrum signals or said combined frequency spectrum signals on the basis of transmission channel frequency responses from which noise component has been removed by said filtering step.

5. A method of receiving diversity according to claim 4, wherein said filtering step comprises
- a step for transforming said transmission channel frequency responses into transmission channel time responses,
- a step for measuring propagation time delay in the environment of multipath reflection of wave propagation, using said transmission channel time responses, and
- a step, in which a band width has been set up so as to remove noises on the basis of said propagation delay time, for carrying out filtering on said transmission channel frequency responses.

6. A method of receiving diversity according to claim 3, comprising:

an amplitude correcting step for carrying out amplitude correction on said combined frequency spectrum signals for each spectrum using said transmission channel frequency responses.

7. A method of receiving diversity according to claim 6, wherein said amplitude correcting step comprises
- a step for finding accumulated value of power by adding power of each of the transmission channel frequency responses obtained from a plurality of said frequency spectrum signals, and
- a normalizing step for normalizing said combined frequency spectrum signals using said accumulated value of power.

8. An apparatus for receiving diversity comprising:

receiving unit which receives orthogonal frequency division multiplexing signals which have been radio-transmitted;

frequency transforming unit which obtains a plurality of frequency spectrum signals by transforming frequencies of said orthogonal frequency division multiplexing signals;

weighting unit which weights frequency spectrum signals obtained from said frequency transforming unit based on transmission channel frequency responses obtained from said frequency spectrum signals;

combining unit which obtains combined frequency spectrum signals by combining a plurality of said frequency spectrum signals;

demodulating unit which demodulates digital signal sequence from said combined frequency spectrum signals;

a unit which generates reference frequency spectrum signals for reference, wherein said transmission channel frequency responses are calculated on the basis of said frequency spectrum signals and said reference frequency spectrum signals; and filtering unit for removing noise component contained in said transmission channel frequency responses, wherein said weighting unit carries out weighting on each of said frequency spectrum signals or said combined frequency spectrum signals on the basis of transmission channel frequency responses from which noise component has been removed by said filtering unit, wherein said filtering unit comprises:
  transmission channel time response transforming unit which transforms transmission channel frequency responses calculated by said transmission channel frequency response calculating unit into transmission channel time responses,
  propagation delay time measuring unit which measures propagation delay time under the environment of multipath reflection wave propagation using transmission channel time responses converted by said transmission channel time response transforming unit,
  bandwidth variable filter which can have bandwidth for noise removal set up variably and performs filtering on said transmission channel frequency responses, and
  bandwidth setting unit which sets up bandwidth of said bandwidth variable filter on the basis of propagation delay time measured by said propagation delay time measuring unit.

9. An apparatus for receiving diversity comprising:
receiving unit which receives orthogonal frequency division multiplexing signals which have been radio-transmitted;

frequency transforming unit which obtains a plurality of frequency spectrum signals by transforming frequencies of said orthogonal frequency division multiplexing signals;

weighting unit which weights frequency spectrum signals obtained from said frequency transforming unit based on transmission channel frequency responses obtained from said frequency spectrum signals;

combining unit which obtains combined frequency spectrum signals by combining a plurality of said frequency spectrum signals;

demodulating unit which demodulates digital signal sequence from said combined frequency spectrum signals;

a unit which generates reference frequency spectrum signals for reference, wherein said transmission channel frequency responses are calculated on the basis of said frequency spectrum signals and said reference frequency spectrum signals; and amplitude correcting unit which carries out amplitude correction of frequency spectrum signals combined by said combining unit for each spectrum using transmission channel frequency responses outputted respectively from each of said receiving unit and outputting them to said demodulating unit, wherein said amplitude correcting unit comprises:
  power adding unit which finds accumulated value of power by adding power of each of the transmission channel frequency responses calculated by transmission channel frequency responding unit of each of said receiving unit, and
  normalizing unit for normalizing said frequency spectrum combined by said combining unit using an accumulated value of power found by said power adding unit.

10. An apparatus for receiving diversity comprising:
receiving unit which receives orthogonal frequency division multiplexing signals which have been radio-transmitted;

frequency transforming unit which obtains a plurality of frequency spectrum signals by transforming frequencies of said orthogonal frequency division multiplexing signals;

weighting unit which weights frequency spectrum signals obtained from said frequency transforming unit based on transmission channel frequency responses obtained from said frequency spectrum signals;

combining unit which obtains combined frequency spectrum signals by combining a plurality of said frequency spectrum signals;

demodulating unit which demodulates digital signal sequence from said combined frequency spectrum signals;

re-modulating unit which generates re-modulated frequency spectrum by re-modulating digital signal sequence which has been demodulated by said demodulating unit;

selecting unit which selects, correspondingly to the type of data contained in orthogonal frequency division multiplexing signals received by said receiving unit, either of re-modulated frequency spectrum signals re-modulated by said re-modulating unit or said frequency spectrum signals for reference, and outputting them to said transmission channel frequency response calculating unit; and delaying unit which delays output of said frequency spectrum transforming unit when said re-modulated frequency spectrum signals are selected by said selecting unit, and to input it to said transmission channel frequency response calculating unit.

11. An apparatus for receiving diversity according to claim 10, comprising:
filtering unit for removes noise component contained in said transmission channel frequency responses, wherein said weighting unit carries out weighting on each of said frequency spectrum signals or said combined frequency spectrum signals on the basis of transmission channel frequency responses from which noise component has been removed by said filtering unit.

12. An apparatus for receiving diversity according to claim 11,
wherein said filtering unit comprises
  transmission channel time response transforming unit which transforms transmission channel frequency responses calculated by said transmission channel frequency response calculating unit into transmission channel time responses, propagation delay time measuring unit which measures propagation delay time under the environment of multipath reflection wave propagation using transmission channel time responses converted by said transmission channel time response transforming unit, bandwidth variable filter which can have bandwidth for noise removal set up variably and performs filtering on said transmission channel frequency responses, and bandwidth setting unit which sets up bandwidth of said bandwidth variable filter on the basis of propagation delay time measured by said propagation delay time measuring unit.

13. An apparatus for receiving diversity according to claim 10, further comprising:

amplitude correcting unit which carrys out amplitude correction of frequency spectrum signals combined by said combining unit for each spectrum using transmission channel frequency responses outputted respectively from each of said receiving unit and outputting them to said demodulating unit.

14. An apparatus for receiving diversity according to claim 13, wherein said amplitude correcting unit comprises power adding unit which finds accumulated value of power by adding power of each of the transmission channel frequency responses calculated by transmission channel frequency responding unit of each of said receiving unit, and normalizing unit for normalizing said frequency spectrum combined by said combining unit using an accumulated value of power found by said power adding unit.

* * * * *